(12) United States Patent
Shah et al.

(10) Patent No.: US 8,664,573 B2
(45) Date of Patent: Mar. 4, 2014

(54) CNT-BASED RESISTIVE HEATING FOR DEICING COMPOSITE STRUCTURES

(75) Inventors: Tushar K. Shah, Columbia, MD (US); Harry C. Malecki, Abingdon, MD (US); Daniel Jacob Adcock, Columbia, MD (US)

(73) Assignee: Applied NanoStructured Solutions, LLC, Baltimore, MD (US)

( * ) Notice: Subject to any disclaimer, the term of this patent is extended or adjusted under 35 U.S.C. 154(b) by 392 days.

(21) Appl. No.: 12/767,719

(22) Filed: Apr. 26, 2010

(65) Prior Publication Data

US 2011/0024409 A1 Feb. 3, 2011

Related U.S. Application Data

(60) Provisional application No. 61/173,027, filed on Apr. 27, 2009.

(51) Int. Cl.
*B23K 15/02* (2006.01)

(52) U.S. Cl.
USPC ............ 219/482; 428/323; 219/553; 977/902

(58) Field of Classification Search
USPC ................... 219/428, 553; 428/323; 977/902
See application file for complete search history.

(56) References Cited

U.S. PATENT DOCUMENTS

| | | |
|---|---|---|
| 4,104,083 A | 8/1978 | Hirano |
| 4,313,084 A | 1/1982 | Hosokawa et al. |
| 4,488,203 A | 12/1984 | Muranaka et al. |
| 4,515,107 A | 5/1985 | Fournier et al. |
| 4,530,750 A | 7/1985 | Aisenberg et al. |
| 4,581,284 A | 4/1986 | Eggert et al. |
| 4,707,349 A | 11/1987 | Hjersted |
| 4,920,917 A | 5/1990 | Nakatani et al. |
| 5,093,155 A | 3/1992 | Miyazaki et al. |
| 5,103,067 A | 4/1992 | Aldissi |
| 5,130,194 A | 7/1992 | Baker et al. |
| 5,156,225 A | 10/1992 | Murrin |
| 5,173,367 A | 12/1992 | Liimatta et al. |

(Continued)

FOREIGN PATENT DOCUMENTS

| | | |
|---|---|---|
| CN | 1970612 A | 5/2007 |
| CN | 101698975 | 4/2010 |

(Continued)

OTHER PUBLICATIONS

U.S. Appl. No. 12/766,817, filed Apr. 23, 2010, Tushar K. Shah.

(Continued)

*Primary Examiner* — Julio J Maldonado
*Assistant Examiner* — Robert Bachner
(74) *Attorney, Agent, or Firm* — McDermott Will & Emery LLP

(57) ABSTRACT

A composite structure includes a matrix material and a carbon nanotube (CNT)-infused fiber material that includes a plurality of carbon nanotubes (CNTs) infused to a fiber material. The CNT-infused fiber material is disposed throughout a portion of the matrix material. The composite structure is adapted for application of a current through the CNT-infused fiber material to provide heating of the composite structure. A heating element includes a CNT-infused fiber material includes a plurality of CNTs infused to a fiber material. The CNT-infused fiber material is of sufficient proportions to provide heating to a structure in need thereof.

25 Claims, 13 Drawing Sheets

(56) References Cited

U.S. PATENT DOCUMENTS

| | | | |
|---|---|---|---|
| 5,221,605 A | 6/1993 | Bard et al. |
| 5,238,808 A | 8/1993 | Bard et al. |
| 5,246,794 A | 9/1993 | Blomgren et al. |
| 5,310,687 A | 5/1994 | Bard et al. |
| 5,449,574 A | 9/1995 | Higley |
| 5,470,408 A | 11/1995 | Nielson et al. |
| 5,514,217 A | 5/1996 | Niino et al. |
| 5,547,525 A | 8/1996 | Bennett et al. |
| 5,571,749 A | 11/1996 | Matsuda et al. |
| 5,581,438 A | 12/1996 | Halliop |
| 5,583,318 A | 12/1996 | Powell |
| 5,639,984 A | 6/1997 | Nielson |
| 5,707,758 A | 1/1998 | Iwatsu et al. |
| 5,714,089 A | 2/1998 | Bard et al. |
| 5,731,147 A | 3/1998 | Bard et al. |
| 5,908,585 A | 6/1999 | Shibuta |
| 5,968,274 A | 10/1999 | Fujioka et al. |
| 5,997,832 A | 12/1999 | Lieber et al. |
| 6,140,138 A | 10/2000 | Bard et al. |
| 6,146,783 A | 11/2000 | Brohm et al. |
| 6,180,281 B1 | 1/2001 | Schneider et al. |
| 6,184,280 B1 | 2/2001 | Shibuta |
| 6,194,685 B1* | 2/2001 | Rutherford ............ 219/201 |
| 6,221,154 B1 | 4/2001 | Lee et al. |
| 6,225,565 B1 | 5/2001 | Prysner |
| 6,232,706 B1 | 5/2001 | Dai et al. |
| 6,233,135 B1 | 5/2001 | Farahmandi et al. |
| 6,251,520 B1 | 6/2001 | Blizzard et al. |
| 6,265,466 B1 | 7/2001 | Glatkowski et al. |
| 6,331,209 B1 | 12/2001 | Jang et al. |
| 6,333,016 B1 | 12/2001 | Resasco et al. |
| 6,361,861 B2 | 3/2002 | Gao |
| 6,413,487 B1 | 7/2002 | Resasco et al. |
| 6,420,293 B1 | 7/2002 | Chang et al. |
| 6,430,031 B1 | 8/2002 | Dispennette et al. |
| 6,454,816 B1 | 9/2002 | Lee et al. |
| 6,455,021 B1 | 9/2002 | Saito |
| 6,465,057 B1 | 10/2002 | Nakahigashi et al. |
| 6,479,028 B1 | 11/2002 | Kaner et al. |
| 6,479,030 B1 | 11/2002 | Firsich |
| 6,491,789 B2 | 12/2002 | Niu |
| 6,495,258 B1 | 12/2002 | Chen et al. |
| 6,528,572 B1 | 3/2003 | Patel et al. |
| 6,564,744 B2 | 5/2003 | Nakahigashi et al. |
| 6,585,152 B2 | 7/2003 | Farahmandi et al. |
| 6,602,742 B2 | 8/2003 | Maletin et al. |
| 6,639,786 B2 | 10/2003 | Noguchi et al. |
| 6,650,531 B2 | 11/2003 | Ikeda et al. |
| 6,653,619 B2 | 11/2003 | Chin et al. |
| 6,673,392 B2 | 1/2004 | Lee et al. |
| 6,686,537 B1 | 2/2004 | Gareis et al. |
| 6,692,717 B1 | 2/2004 | Smalley et al. |
| 6,765,949 B2 | 7/2004 | Chang |
| 6,773,466 B1 | 8/2004 | Hiratsuka et al. |
| 6,790,425 B1 | 9/2004 | Smalley et al. |
| 6,818,821 B2 | 11/2004 | Fujieda et al. |
| 6,831,826 B2 | 12/2004 | Iwaida et al. |
| 6,837,928 B1 | 1/2005 | Zhang et al. |
| 6,852,410 B2 | 2/2005 | Veedu et al. |
| 6,863,942 B2 | 3/2005 | Ren et al. |
| 6,887,451 B2 | 5/2005 | Dodelet et al. |
| 6,900,264 B2 | 5/2005 | Kumar et al. |
| 6,900,580 B2 | 5/2005 | Dai et al. |
| 6,908,572 B1 | 6/2005 | Derbyshire et al. |
| 6,913,075 B1 | 7/2005 | Knowles et al. |
| 6,934,600 B2 | 8/2005 | Jang et al. |
| 6,936,653 B2 | 8/2005 | McElrath et al. |
| 6,949,237 B2* | 9/2005 | Smalley et al. ............ 423/447.3 |
| 6,955,800 B2 | 10/2005 | Resasco et al. |
| 6,962,892 B2 | 11/2005 | Resasco et al. |
| 6,967,013 B2 | 11/2005 | Someya et al. |
| 6,979,709 B2 | 12/2005 | Smalley et al. |
| 6,986,853 B2 | 1/2006 | Glatkowski et al. |
| 6,986,877 B2 | 1/2006 | Takikawa et al. |
| 6,994,907 B2 | 2/2006 | Resasco et al. |
| 7,011,760 B2 | 3/2006 | Wang et al. |
| 7,018,600 B2 | 3/2006 | Yanagisawa et al. |
| 7,022,776 B2 | 4/2006 | Bastiaens et al. |
| 7,045,108 B2 | 5/2006 | Jiang et al. |
| 7,056,452 B2 | 6/2006 | Niu et al. |
| 7,060,326 B2 | 6/2006 | Hiel et al. |
| 7,061,749 B2 | 6/2006 | Liu et al. |
| 7,074,294 B2 | 7/2006 | Dubrow |
| 7,085,125 B2 | 8/2006 | Sung |
| 7,094,386 B2 | 8/2006 | Resasco et al. |
| 7,105,596 B2 | 9/2006 | Smalley et al. |
| 7,108,841 B2 | 9/2006 | Smalley et al. |
| 7,118,693 B2 | 10/2006 | Glatkowski et al. |
| 7,125,502 B2 | 10/2006 | Smalley et al. |
| 7,125,534 B1 | 10/2006 | Smalley et al. |
| 7,132,621 B2 | 11/2006 | Kumar et al. |
| 7,144,563 B2 | 12/2006 | Rao et al. |
| 7,148,619 B2 | 12/2006 | Ken et al. |
| 7,151,129 B2 | 12/2006 | Ishikawa et al. |
| 7,153,452 B2 | 12/2006 | Ogale et al. |
| 7,157,068 B2 | 1/2007 | Li et al. |
| 7,160,532 B2 | 1/2007 | Liu et al. |
| 7,189,959 B1 | 3/2007 | Morison et al. |
| 7,211,320 B1 | 5/2007 | Cooper et al. |
| 7,226,643 B2 | 6/2007 | Juang et al. |
| 7,235,159 B2 | 6/2007 | Gu et al. |
| 7,253,442 B2 | 8/2007 | Huang et al. |
| 7,261,779 B2 | 8/2007 | Gardner |
| 7,265,174 B2 | 9/2007 | Carroll et al. |
| 7,265,175 B2 | 9/2007 | Winey et al. |
| 7,278,324 B2 | 10/2007 | Smits et al. |
| 7,289,312 B2 | 10/2007 | Duff, Jr. |
| 7,294,302 B2 | 11/2007 | Koide et al. |
| 7,312,608 B2 | 12/2007 | Georgeson et al. |
| 7,329,698 B2 | 2/2008 | Noguchi et al. |
| 7,338,684 B1 | 3/2008 | Curliss et al. |
| 7,340,134 B1 | 3/2008 | Hudson, II et al. |
| 7,352,559 B2 | 4/2008 | Sung |
| 7,354,877 B2 | 4/2008 | Rosenberger et al. |
| 7,354,881 B2 | 4/2008 | Resasco et al. |
| 7,354,988 B2 | 4/2008 | Charati et al. |
| 7,372,880 B2 | 5/2008 | Jablonski et al. |
| 7,384,663 B2 | 6/2008 | Olry et al. |
| 7,399,794 B2 | 7/2008 | Harmon et al. |
| 7,407,640 B2 | 8/2008 | Barrera et al. |
| 7,407,901 B2 | 8/2008 | Bystricky et al. |
| 7,410,628 B2 | 8/2008 | Bening et al. |
| 7,419,601 B2 | 9/2008 | Cooper et al. |
| 7,431,965 B2 | 10/2008 | Grigorian et al. |
| 7,435,476 B2 | 10/2008 | Viswanathan et al. |
| 7,442,284 B2 | 10/2008 | Ren et al. |
| 7,445,817 B2 | 11/2008 | Kumar et al. |
| 7,448,441 B2 | 11/2008 | Hendricks et al. |
| 7,448,931 B2 | 11/2008 | Liu et al. |
| 7,459,627 B2 | 12/2008 | Lee et al. |
| 7,465,605 B2 | 12/2008 | Raravikar et al. |
| 7,466,539 B2 | 12/2008 | Dementiev et al. |
| 7,473,466 B1 | 1/2009 | Muradov |
| 7,479,052 B2 | 1/2009 | Kim et al. |
| 7,488,455 B2 | 2/2009 | Dai et al. |
| 7,504,078 B1 | 3/2009 | Jacques et al. |
| 7,510,695 B2 | 3/2009 | Smalley et al. |
| 7,531,267 B2 | 5/2009 | Kim |
| 7,532,454 B2 | 5/2009 | Plee et al. |
| 7,534,486 B2 | 5/2009 | Boerstoel et al. |
| 7,553,341 B2 | 6/2009 | Pan et al. |
| 7,563,411 B2 | 7/2009 | Jiang et al. |
| 7,563,428 B2 | 7/2009 | Resasco et al. |
| 7,569,425 B2 | 8/2009 | Huang et al. |
| 7,579,112 B2 | 8/2009 | Chiang et al. |
| 7,588,700 B2 | 9/2009 | Kwon et al. |
| 7,592,248 B2 | 9/2009 | Ventzek et al. |
| 7,597,869 B2 | 10/2009 | Hsiao |
| 7,608,798 B2 | 10/2009 | Kumar et al. |
| 7,611,579 B2 | 11/2009 | Lashmore et al. |
| 7,612,985 B2 | 11/2009 | Dementiev et al. |
| 7,615,204 B2 | 11/2009 | Ajayan et al. |
| 7,615,205 B2 | 11/2009 | Jiang et al. |
| 7,632,550 B2 | 12/2009 | Mizuno et al. |

(56) References Cited

U.S. PATENT DOCUMENTS

| | | |
|---|---|---|
| 7,632,569 B2 | 12/2009 | Smalley et al. |
| 7,700,943 B2 | 4/2010 | Raravikar et al. |
| 7,709,087 B2 | 5/2010 | Majidi et al. |
| 7,718,220 B2 | 5/2010 | D'Silva et al. |
| 7,771,798 B1 | 8/2010 | Grosse et al. |
| 7,776,777 B2 | 8/2010 | Kim et al. |
| 7,793,653 B2 | 9/2010 | Kuckelkorn et al. |
| 7,811,632 B2 | 10/2010 | Eres |
| 7,815,820 B2 | 10/2010 | Tan et al. |
| 7,816,709 B2 | 10/2010 | Balzano et al. |
| 7,820,329 B2 | 10/2010 | Boulton et al. |
| 7,862,795 B2 | 1/2011 | Zhang et al. |
| 7,871,591 B2 | 1/2011 | Harutyunyan et al. |
| 7,880,376 B2 | 2/2011 | Takai et al. |
| 7,927,701 B2 | 4/2011 | Curliss et al. |
| 2002/0035170 A1 | 3/2002 | Glatkowski et al. |
| 2002/0048143 A1 | 4/2002 | Lee et al. |
| 2002/0085968 A1 | 7/2002 | Smalley et al. |
| 2002/0098135 A1 | 7/2002 | Smalley et al. |
| 2002/0136683 A1 | 9/2002 | Smalley et al. |
| 2003/0042147 A1 | 3/2003 | Talin et al. |
| 2003/0044678 A1 | 3/2003 | Esq. |
| 2003/0055153 A1 | 3/2003 | Luippold et al. |
| 2003/0102585 A1 | 6/2003 | Poulin et al. |
| 2003/0111333 A1 | 6/2003 | Montgomery et al. |
| 2003/0143453 A1 | 7/2003 | Ren et al. |
| 2004/0007955 A1 | 1/2004 | Yaniv et al. |
| 2004/0018375 A1 | 1/2004 | Banno et al. |
| 2004/0026234 A1 | 2/2004 | Vanden Brande et al. |
| 2004/0071870 A1 | 4/2004 | Knowles et al. |
| 2004/0082247 A1 | 4/2004 | Desai et al. |
| 2004/0096389 A1 | 5/2004 | Lobovsky et al. |
| 2004/0105807 A1 | 6/2004 | Fan et al. |
| 2004/0111141 A1 | 6/2004 | Brabec et al. |
| 2004/0184981 A1 | 9/2004 | Liu et al. |
| 2004/0197546 A1 | 10/2004 | Rinzler et al. |
| 2004/0210289 A1 | 10/2004 | Wang et al. |
| 2004/0241532 A1 | 12/2004 | Kim |
| 2004/0245088 A1 | 12/2004 | Gardner |
| 2004/0253167 A1 | 12/2004 | Silva et al. |
| 2005/0090176 A1 | 4/2005 | Dean et al. |
| 2005/0100501 A1 | 5/2005 | Veedu et al. |
| 2005/0112052 A1 | 5/2005 | Gu et al. |
| 2005/0113876 A1 | 5/2005 | Weiner et al. |
| 2005/0119371 A1 | 6/2005 | Drzal et al. |
| 2005/0170177 A1 | 8/2005 | Crawford et al. |
| 2005/0172370 A1 | 8/2005 | Haq et al. |
| 2005/0176329 A1 | 8/2005 | Olry et al. |
| 2005/0188727 A1 | 9/2005 | Greywall |
| 2005/0214648 A1 | 9/2005 | Boulton et al. |
| 2005/0231893 A1 | 10/2005 | Harvey |
| 2005/0238810 A1 | 10/2005 | Scaringe et al. |
| 2005/0260412 A1 | 11/2005 | Gardner |
| 2005/0263456 A1 | 12/2005 | Cooper et al. |
| 2005/0287064 A1 | 12/2005 | Mayne et al. |
| 2006/0052509 A1 | 3/2006 | Saitoh |
| 2006/0054866 A1 | 3/2006 | Ait-Haddou et al. |
| 2006/0110599 A1 | 5/2006 | Honma et al. |
| 2006/0121275 A1 | 6/2006 | Poulin et al. |
| 2006/0126268 A1 | 6/2006 | Sung |
| 2006/0159916 A1 | 7/2006 | Dubrow et al. |
| 2006/0177602 A1 | 8/2006 | Dijon et al. |
| 2006/0198956 A1 | 9/2006 | Eres |
| 2006/0233692 A1 | 10/2006 | Scaringe et al. |
| 2006/0241236 A1 | 10/2006 | Kuznetsov et al. |
| 2006/0249203 A1 | 11/2006 | Li et al. |
| 2006/0253942 A1 | 11/2006 | Barrera et al. |
| 2007/0020167 A1 | 1/2007 | Han et al. |
| 2007/0036709 A1 | 2/2007 | Lashmore et al. |
| 2007/0048521 A1 | 3/2007 | Istvan |
| 2007/0054105 A1 | 3/2007 | Hsiao |
| 2007/0062799 A1 | 3/2007 | Lee |
| 2007/0070579 A1 | 3/2007 | Sung |
| 2007/0076349 A1 | 4/2007 | Dementiev et al. |
| 2007/0092431 A1 | 4/2007 | Resasco et al. |
| 2007/0110977 A1 | 5/2007 | Al-Haik et al. |
| 2007/0128960 A1 | 6/2007 | Ghasemi Nejhad et al. |
| 2007/0134555 A1 | 6/2007 | Ren et al. |
| 2007/0135588 A1 | 6/2007 | Diakoumakos et al. |
| 2007/0166603 A1 | 7/2007 | Nakanishi et al. |
| 2007/0189953 A1 | 8/2007 | Bai et al. |
| 2007/0237990 A1 | 10/2007 | Kim |
| 2007/0241962 A1 | 10/2007 | Shinoda et al. |
| 2007/0259128 A1 | 11/2007 | Parsapour |
| 2008/0010796 A1 | 1/2008 | Pan et al. |
| 2008/0014431 A1 | 1/2008 | Lashmore et al. |
| 2008/0020193 A1 | 1/2008 | Jang et al. |
| 2008/0048364 A1 | 2/2008 | Armeniades et al. |
| 2008/0049380 A1 | 2/2008 | Miyahara et al. |
| 2008/0053922 A1 | 3/2008 | Honsinger, Jr. et al. |
| 2008/0057265 A1 | 3/2008 | Liang et al. |
| 2008/0063585 A1 | 3/2008 | Smalley |
| 2008/0075954 A1 | 3/2008 | Wardle et al. |
| 2008/0102371 A1 | 5/2008 | Mitchell et al. |
| 2008/0117562 A1 | 5/2008 | Maruyama et al. |
| 2008/0118753 A1 | 5/2008 | Poulin et al. |
| 2008/0137890 A1 | 6/2008 | Petersen et al. |
| 2008/0160286 A1 | 7/2008 | Asrar et al. |
| 2008/0170982 A1 | 7/2008 | Zhang et al. |
| 2008/0173111 A1 | 7/2008 | Thostenson et al. |
| 2008/0182108 A1 | 7/2008 | Curliss et al. |
| 2008/0187482 A1 | 8/2008 | Chen et al. |
| 2008/0187648 A1 | 8/2008 | Hart et al. |
| 2008/0195187 A1 | 8/2008 | Li et al. |
| 2008/0212261 A1 | 9/2008 | Ajayan et al. |
| 2008/0247938 A1* | 10/2008 | Tsai et al. ............... 423/447.2 |
| 2008/0248192 A1 | 10/2008 | Long et al. |
| 2008/0248362 A1 | 10/2008 | Sayre et al. |
| 2008/0251971 A1 | 10/2008 | Kim et al. |
| 2008/0273290 A1 | 11/2008 | Dementiev et al. |
| 2008/0279753 A1 | 11/2008 | Harutyunyan |
| 2008/0286564 A1 | 11/2008 | Tsotsis |
| 2008/0297980 A1 | 12/2008 | Bourcier et al. |
| 2009/0017301 A1 | 1/2009 | Moireau |
| 2009/0020734 A1 | 1/2009 | Jang et al. |
| 2009/0029127 A1 | 1/2009 | Watanabe et al. |
| 2009/0047453 A1 | 2/2009 | Folaron et al. |
| 2009/0047502 A1 | 2/2009 | Folaron et al. |
| 2009/0053512 A1 | 2/2009 | Pyun et al. |
| 2009/0059474 A1 | 3/2009 | Zhamu et al. |
| 2009/0068387 A1 | 3/2009 | Panzer et al. |
| 2009/0068461 A1 | 3/2009 | Reneker et al. |
| 2009/0072222 A1 | 3/2009 | Radisic et al. |
| 2009/0081383 A1 | 3/2009 | Alberding et al. |
| 2009/0081441 A1 | 3/2009 | Shah et al. |
| 2009/0087743 A1 | 4/2009 | Kim et al. |
| 2009/0092832 A1 | 4/2009 | Moireau |
| 2009/0098453 A1 | 4/2009 | Liu et al. |
| 2009/0099016 A1 | 4/2009 | Carruthers et al. |
| 2009/0117269 A1 | 5/2009 | Hansen et al. |
| 2009/0121219 A1 | 5/2009 | Song et al. |
| 2009/0126783 A1 | 5/2009 | Lin et al. |
| 2009/0136707 A1 | 5/2009 | Ueno |
| 2009/0140098 A1 | 6/2009 | Lengsfeld et al. |
| 2009/0176100 A1 | 7/2009 | Higashi et al. |
| 2009/0176112 A1 | 7/2009 | Kruckenberg et al. |
| 2009/0181309 A1 | 7/2009 | Kwon et al. |
| 2009/0185327 A1 | 7/2009 | Seymour |
| 2009/0186214 A1 | 7/2009 | Lafdi et al. |
| 2009/0186276 A1 | 7/2009 | Zhamu et al. |
| 2009/0191352 A1 | 7/2009 | DuFaux et al. |
| 2009/0192241 A1 | 7/2009 | Raravikar et al. |
| 2009/0208743 A1 | 8/2009 | Pettit |
| 2009/0212430 A1 | 8/2009 | Wyland |
| 2009/0214800 A1 | 8/2009 | Saito |
| 2009/0220409 A1 | 9/2009 | Curliss et al. |
| 2009/0226673 A1 | 9/2009 | Friedersdorf et al. |
| 2009/0244810 A1 | 10/2009 | Reynolds |
| 2009/0258164 A1 | 10/2009 | Nakai et al. |
| 2009/0262484 A1 | 10/2009 | Miyagi |
| 2009/0272946 A1 | 11/2009 | Lu |
| 2009/0282671 A1 | 11/2009 | Tao et al. |
| 2009/0286079 A1 | 11/2009 | Barker et al. |
| 2009/0294022 A1 | 12/2009 | Hayes et al. |

(56) References Cited

U.S. PATENT DOCUMENTS

| | | |
|---|---|---|
| 2009/0294753 A1 | 12/2009 | Hauge et al. |
| 2009/0311166 A1 | 12/2009 | Hart et al. |
| 2009/0314510 A1 | 12/2009 | Kukowski et al. |
| 2010/0000520 A1 | 1/2010 | Vachon |
| 2010/0000754 A1 | 1/2010 | Mann et al. |
| 2010/0000770 A1 | 1/2010 | Gupta et al. |
| 2010/0035124 A1 | 2/2010 | Thompson et al. |
| 2010/0059243 A1 | 3/2010 | Chang |
| 2010/0074834 A1 | 3/2010 | Kim |
| 2010/0087042 A1 | 4/2010 | Kim et al. |
| 2010/0098931 A1 | 4/2010 | Daniel et al. |
| 2010/0099319 A1 | 4/2010 | Lashmore et al. |
| 2010/0159240 A1 | 6/2010 | Shah et al. |
| 2010/0173228 A1 | 7/2010 | Wallace et al. |
| 2010/0178825 A1 | 7/2010 | Shah et al. |
| 2010/0188833 A1 | 7/2010 | Liang et al. |
| 2010/0192851 A1 | 8/2010 | Shah et al. |
| 2010/0196697 A1 | 8/2010 | D'Silva et al. |
| 2010/0197848 A1 | 8/2010 | Verghese et al. |
| 2010/0203362 A1 | 8/2010 | Lam et al. |
| 2010/0206504 A1 | 8/2010 | Akiyama et al. |
| 2010/0210159 A1 | 8/2010 | Zhu |
| 2010/0221424 A1 | 9/2010 | Malecki et al. |
| 2010/0224129 A1 | 9/2010 | Malecki et al. |
| 2010/0227134 A1 | 9/2010 | Shah et al. |
| 2010/0227155 A1 | 9/2010 | Bao et al. |
| 2010/0254885 A1 | 10/2010 | Menchhofer et al. |
| 2010/0258111 A1 | 10/2010 | Shah et al. |
| 2010/0270069 A1 | 10/2010 | Shar et al. |
| 2010/0271253 A1 | 10/2010 | Shah et al. |
| 2010/0272891 A1 | 10/2010 | Malecki et al. |
| 2010/0276072 A1 | 11/2010 | Shah et al. |
| 2010/0279569 A1 | 11/2010 | Shah et al. |
| 2010/0311866 A1 | 12/2010 | Huang et al. |
| 2011/0024409 A1 | 2/2011 | Shah et al. |
| 2011/0024694 A1 | 2/2011 | Shah et al. |
| 2011/0036829 A1 | 2/2011 | Fugetsu et al. |
| 2011/0089958 A1 | 4/2011 | Malecki et al. |
| 2011/0123735 A1 | 5/2011 | Shah et al. |
| 2011/0124253 A1 | 5/2011 | Shah et al. |
| 2011/0124483 A1 | 5/2011 | Shah et al. |
| 2011/0143087 A1 | 6/2011 | Alberding et al. |
| 2011/0163274 A1 | 7/2011 | Plee et al. |
| 2011/0171469 A1 | 7/2011 | Shah et al. |
| 2011/0174519 A1 | 7/2011 | Shah et al. |
| 2011/0186775 A1 | 8/2011 | Shah et al. |
| 2011/0216476 A1 | 9/2011 | Fleischer et al. |
| 2011/0235240 A1 | 9/2011 | Lu et al. |
| 2011/0242731 A1 | 10/2011 | Fleischer et al. |
| 2011/0281068 A1 | 11/2011 | David et al. |
| 2011/0287318 A1 | 11/2011 | Loveness et al. |
| 2011/0297892 A1 | 12/2011 | Shah et al. |
| 2011/0304964 A1 | 12/2011 | Fleischer et al. |
| 2012/0000691 A1 | 1/2012 | Shah et al. |
| 2012/0052363 A1 | 3/2012 | Fleischer et al. |

FOREIGN PATENT DOCUMENTS

| | | |
|---|---|---|
| IN | 01900DE2008 A | 3/2010 |
| JP | 2004/247064 A | 9/2004 |
| KR | 100829001 | 5/2008 |
| TW | 200833861 | 8/2008 |
| WO | WO 03082733 | 10/2003 |
| WO | WO/2006/048531 A1 | 5/2005 |
| WO | WO/2006/115486 A1 | 11/2006 |
| WO | WO 2007/015710 | 2/2007 |
| WO | WO/2007/061854 A2 | 5/2007 |
| WO | WO/2007/089118 A1 | 8/2007 |
| WO | WO/2007/149109 A2 | 12/2007 |
| WO | WO 2008/012196 | 1/2008 |
| WO | WO/2008/041183 A2 | 4/2008 |
| WO | WO/2008/054541 A2 | 5/2008 |
| WO | WO/2008/085634 A1 | 7/2008 |
| WO | WO-2008085550 A2 | 7/2008 |
| WO | WO 2008/115168 | 9/2008 |
| WO | WO/2008/115640 A2 | 9/2008 |
| WO | WO 2008/145787 | 12/2008 |
| WO | WO 2009/004346 | 1/2009 |
| WO | WO 2009110885 | 9/2009 |

OTHER PUBLICATIONS

U.S. Appl. No. 61/295,621, filed Jan. 15, 2010, Harry C. Malecki.

U.S. Appl. No. 61/297,704, filed Jan. 22, 2010, Tushar K. Shah.

Andrews, et al., "Nanotube Composite Carbon Fibers," Applied Physics Letters, Aug. 1999, vol. 75, No. 9, pp. 1329-1331.

Arepalli, et al., "Carbon-Nanotube-Based Electrochemical Double-Layer Capacitor Technologies for Spaceflight Applications," JOM, Dec. 2005, pp. 26-31.

Cui, et al., "Carbon-Silicon Core-Shell Nanowires As High Capacity Electrode for Lithium Ion Batteries," American Chemical Society, vol. xx, No. x.

Fiedler et al, "Can Carbon Nanotubes Be Used to Sense Damage in Composites?", Annales de Chimi—Science des Materiaux, 2004, vol. 29, No. 6, pp. 81-94.

Hsieh, et al., "Synthesis of Carbon Nanotubes on Carbon Fabric for Use As electrochemical Capacitor," Microporous and Mesoporous Materials, (2009), pp. 155-159, vol. 122.

Jo, et al., "Field Emission of Carbon Nanotubes Grown on Carbon Cloth," Applied Physics Letters, Aug. 2, 2004, pp. 810-812, vol. 85, No. 5.

Kramer, et al., Constrained Iron Catalysts for Single-Walled Carbon Nanotube Growth?, Langmuir 2005, 21, 8466-8470 [http://pubs.acs.org/dol/abs/10.1021/Ia0506729].

Parrish, "Carbon Nanotubes and Carbon Layer Nanostructured Composites Grown in Improved Process," Capella University, Before It's News, Jul. 9, 2010.

Wang, et al., "Processing and property investigation of single-walled carbon nanotube (SWNT) buckypaper/epoxy resin matrix nanocomposites", Composites: Part A, 2004, pp. 1225-1232, vol. 35, Elsevier Ltd.

Zhang et al., "Integration and characterization of aligned carbon nanotubes on metal/silicon substrates and effects of water", Applied Surface Science 255 (2009) 5003-5008, entire document.

Zhao et al., "The Use of Carbon Nanotubes to Sense Matrix Stresses Around a Single Glass Fiber," Composites Science and Technology, Nov. 2001, vol. 61, No. 14, pp. 2139-2143.

Zhao, et al., "Carbon Nanosheets As the Electrode Material in Supercapacitors," Journal of Power Sources 194 (2009 pp. 1208-1212.

Ago, et al., "Colloidal Solution of Metal Nanoparticles as a Catalyst for Carbon Nanotube Growth", Proceedings Materials Research Society, Fall 2000, pp. A13.18.1-A13.18.5, vol. 633, Materials Research Society.

Bradford, et al., "Electrical Conductivity Study of Carbon nanotube Yarns, 3-D Hybrid Braids and their Composites", Jouranl of Composite Materials, pp. 1533-1545, vol. 42, No. 15, SAGE Productions, Los Angeles, London, New Delhi and Singapore.

Bubert, et al., "Basic analytical investigation of plasma-chemically modified carbon fibers", Spectrochimica Acta Part B., 2002, pp. 1601-1610, vol. 57, Elsevier Science B.V.

Chae, et al., "A comparison of reinforcement efficiency of various types of carbon nanotubes in polyacrylonitrile fiber", Polymer, Nov. 21, 2005, pp. 10925-10935, vol. 46, No. 24, Elsevier Ltd.

Che, et al., "Chemical Vapor Deposition Based Synthesis of Carbon Nanotubes and Nanofibers Using a Template Method", Chem. Mater., 1998, pp. 260-267, vol. 10, American Chemical Society.

Chen, et al., "Basalt fiber-epoxy laminates with functionalized multi-walled carbon nanotubes", Composites, Part A, 2009, pp. 1082-1089, vol. 40, Elsevier Ltd.

Chen, et al., "Pulsed electrodeposition of Pt nanoclusters on carbon nanotubes modified carbon materials using diffusion restricting viscous electroyles", Electrochemistry Communications, Jun. 2007, pp. 1348-1354, vol. 9, Elsevier B.V.

Ci, et al., "Direct Growth of Carbon Nanotubes on the Surface of Ceramic Fibers", Carbon, 2005, pp. 883-886, vol. 43, No. 4, Elsevier Ltd.

(56) References Cited

OTHER PUBLICATIONS

Franz, et al., "Carbon Single-Wall Nanotube Growth in a Volumetrically Confined Arc Discharge System", U.S. Departement of Energy Journal of Undergraduate Research, pp. 66-69, publication date unknown.

Garcia, et al., "Aligned Carbon Nanotube Reinforcement of Advanced Composite Ply Interfaces," 49th AIAA/ASCE/AHS/ASC Structures, Structural Dynamics, and Materials Conference, Apr. 7-10, 2008, Schaumburg, IL, MIT, American Institute of Aeronautics and Astronautics, Inc.

Hsu, et al., "Optical Absorption and Thermal Transport of Individual Suspended Carbon Nanotube Bundles", Nano Lett., 2009, pp. 590-594, vol. 9, No. 2, American Chemical Society, Publication Date (Web): Jan. 13, 2009.

Jiang, et al., "Carbon nanotube-coated solid-phase microextraction metal fiber based on sol-gel technique", Journal of Chromatography A., May 29, 2009, pp. 4641-4647, vol. 1216, Elsevier B.V.

Jiang, et al., "Plasma-Enhanced Deposition of Silver Nanoparticles onto Polymer and Metal Surfaces for the Generation of Antimicrobial Characteristics", Journal of Applied_Polymer Science, 2004, pp. 1411-1422, vol. 93, Wiley Periodicals, Inc.

Jung, et al., "Fabrication of radar absorbing structure (RAS) using GFR-nano composite and spring-back compensation of hybrid composite RAS shells", Composite Structures, 2006, pp. 571-576, vol. 75, Elsevier Ltd.

Kim, et al., "Processing, characterization, and modeling of carbon nanotube-reinforced multiscale composites," Composites Science and Technology, 2009, pp. 335,342, vol. 69, Elsevier Ltd.

Kind, et al., "Patterned Films of Nanotubes Using Microcontact Printing of Catalysts", Adv. Mater., 1999, pp. 1285-1289, vol. 11, No. 15, Wiley-VCH Verlag GmbH, D-69469 Weinheim.

Laachachi, et al., "A chemical method to graft carbon nanotubes onto a carbon fiber", Materials Letters, 2008, pp. 394-397, vol. 62, Elsevier B.V.

Lee, "Syntheses and properties of fluorinated carbon materials", Journal of Fluorine Chemistry, 2007, pp. 392-403, vol. 128, Elsevier B.V.

Lee, et al., "Fabrication and design of multi-layered radar absorbing structures of MWNT-filled glass/epoxy plain-weave composites", Composite Structures, 2006, pp. 397-405, vol. 76, Elsevier Ltd.

Li, et al., "A Miniature glucose/$O_2$ biofuel cell with single-walled carbon nanotubes-modified carbon fiber microelectrodes as the substrate", Electrochemistry Communications, Jun. 2008, pp. 851-854, vol. 10, Elsevier B.V.

Li, et al., "Electromagnetic Interference (EMI) Shielding of Single-Walled Carbon Nanotube Epoxy Composites", Nano Lett., 2006, pp. 1141-1145, vol. 6, No. 6, American Chemical Society.

Makris, et al., "Carbon Nanotubes Growth and Anchorage to Carbon Fibres", Carbon Nanotubes, 2006, pp. 57-58, vol. 222, Springer, the Netherlands.

Meyyappan, et al., "Carbon nanotube growth by PECVD: a review", Plasma Sources Sci. Technol., 2003, pp. 205-216, vol. 12, IOP Publishing Ltd, UK.

Mylvaganam, "Fabrication and Application of Polymer Composites Comprising Carbon Nanotubes", Recent Pat Nanotechnol., 2007, pp. 59-65, vol. 1, Bentham Science Publishers, Ltd.

Panhuis, et al., "Carbon Nanotube Mediated Reduction in Optical Activity in Polyaniline Composite Materials", J. Phys. Chem. C, 2008, pp. 1441-1445, vol. 112, American Chemical Society.

Pisco, et al., "Hollow fibers integrated with single walled carbon nanotubes: Bandgap modification and chemical sensing capability", Sensors and Actuators B, 2008, pp. 163-170, vol. 129, Elsevier B.V.

Račkauskas "Carbon nanotube growth and use in energy sector", Energetika, 2006, pp. 43-46, vol. 2.

Satishkumar, et al., "Bundles of aligned carbon nanotubes obtained by the pyrolysis of ferrocene-hydrocarbon mixtures: role of the metal nanoparticles produced in situ", Chemical Physics Letters, 1999, pp. 158-162, vol. 307, Elsevier Science B.V.

Suh, et al., "Highly ordered two-dimensional carbon nanotube arrays", Applied Physics Letters, Oct. 4, 2002, pp. 2047-2049, vol. 75, No. 14, American Institute of Physics.

Thostenson, et al., "Carbon nanotube/carbon fiber hybrid multiscale composites", J. Appl. Phys., 2002, pp. 6034-6037, vol. 91, No. 9, American Institute of Physics.

Wang, et al., "Penetration depth of atmospheric pressure plasma surface modification into multiple layers of polyester fabrics", Surface and Coatings Technology, 2007, pp. 77-83, vol. 202, Elsevier B.V.

Wang, et al., "Processing and property investigation of single-walled carbon nanotube (SWNT) buckypaper/epoxy resin matrix nanocomposites", Composites, Part A, 2004, pp. 1225-1232, vol. 35, Elsevier Ltd.

Wichmann, et al., "Glass-fibre-reinforced composites with enhanced mechanical and electrical properties—Benefits and limitations of a nanoparticle modified matrix", Engineering Fracture Mechanics, 2006, pp. 2346-2359, vol. 73, Elsevier Ltd.

Xu, et al., "Bone-Shaped Nanomaterials for Nanocomposite Applications", Nano Lett., 2003, pp. 1135-1139, vol. 3, No. 8, American Chemical Society.

Yabe, et al., Synthesis of well-aligned carbon nanotubes by radio frequency plasma enhanced CVD method, Diamond and Related Materials, 2004, pp. 1292-1295, vol. 13, Elsevier B.V.

Yanagishita, et al., "Carbon Nanotubes with a Triangular Cross-section, Fabricated Using Anodic Porous Alumina as the Temple", Adv. Mater., 204, pp. 429-432, vol. 16, No. 5, Wiley-VCH Verlag GmbH & Co. KGaA, Weinheim.

Yang, et al., "Electrical Conductivity and Electromagnetic Interference Shielding of Multi-walled Carbon Nanotube Filled Polymer Composites" Mater. Res. Soc. Symp. Proc., 2005, pp. HH5.3.1-HH. 5.3.5, vol. 858E, Materials Research Society.

Yeh, et al., "Mechanical properties of phenolic-based nanocomposites reinforced by multi-walled carbon nanotubes and carbon fibers", Composites: Part A, 2008, pp. 677-684, vol. 39, No. 4.

Zhang, et al., "In situ growth of carbon nanotubes on inorganic fibers with different surface properties," Materials Chemistry and Physics, 2008, pp. 317-321, vol. 107, Science Direct.

Zhao, et al., "Growth of carbon nanotubes on the surface of carbon fibers", Carbon, 2007, pp. 380-383, vol. 46, No. 2, Elsevier Ltd.

Zhao, et al., "The growth of multi-walled carbon nanotubes with different morphologies on carbon fibers", Carbon, 2005, pp. 651-673, vol. 43, Elsevier Ltd.

Zhu, et al., "Carbon nanotube growth on carbon fibers", Diamond and Related Materials, 2003, pp. 1825-1825, vol. 12, Elsevier B.V.

Zhu, et al., "Synthesis of single-walled carbon nanotubes by the vertical floating catalyst method," Chinese Science Bulletin, 2002, pp. 159-162, vol. 47, No. 2.

Garcia, et al., "Fabrication and multifunctional properties of a hybrid laminate with aligned carbon nanotubes grown In Situ", Composites Science and Technology, Jul. 1, 2008, pp. 2034-2041, vol. 68, No. 9.

Hou et al., "A resistance-based damage location sensor for carbon-fibre composites", Smart Materials and Structures, Nov. 4, 2002, vol. 11, pp. 966-969.

Thostenson et al., "Real-time in situ sensing of damage evolution in advanced fiber composites using carbon nanotube networks", Nanotechnology, Apr. 23, 2008, vol. 19.

* cited by examiner

United States Patent US 8,664,573 B2

CNT-BASED RESISTIVE HEATING FOR DEICING COMPOSITE STRUCTURES

STATEMENT OF RELATED APPLICATIONS

This application claims priority to U.S. Provisional Application Nos. 61/173,027, filed Apr. 27, 2009, and is incorporated herein by reference in its entirety.

FIELD OF THE INVENTION

The present invention relates to composite materials, more specifically to composite materials modified with carbon nanotubes.

BACKGROUND OF THE INVENTION

The increased exposure of composite materials to a wide range of environmental conditions has increased the demands placed on these materials. One such demand involves the deicing of composite structures. For example, the formation of ice on structures such as on leading edges of aircraft aerodynamic surfaces, such as wings, empennages or engine nacelles poses significant technical and safety concerns. A layer of ice as thin as one (1) millimeter (mm) may be sufficient to destabilize an in-flight aircraft.

It has been indicated that to prevent against the formation of ice or to eliminate ice already formed, the leading edge of such aerodynamic surfaces can be deiced by warming with pressurized hot air tapped off from at least one of the engines of the aircraft and conveyed into the interior of the leading edge by a pressurized hot air circulation circuit. The hot air operates to weaken the ice-surface bonding which destabilizes the ice, thereby causing the slipstream behind the aircraft to dislodge the ice from the surface (e.g. a wing) and facilitate its removal.

Another approach to deicing includes a heating coil disposed beneath a surface which is prone to accumulate ice. However, use of embedded heating elements requires that heat generated by the heating elements be effectively conducted to the surface of the structure to melt the ice. In this regard, it can be difficult to heat a composite external surface effectively due to poor heat transfer from imbedded heating devices to the surrounding composite material. Although the use of composite materials for structures such as aircraft wings is desirable for their favorable strength to weight ratios, such materials are generally insulators due to the presence of the matrix, such as a typical resin matrix. Thus, resistive heating has been limited due poor conducting properties of the composite materials.

Another approach to providing resistive heating is to apply a metal spray coating over a surface of the composite structure. An electric current is applied to the metal coating, which provides resistive heating to dislodge any ice deposited thereon. However, such metal coatings incur increased cost and complexity due to the specialized manufacturing processes used to apply the coatings. Moreover, the increased weight of the overall structure detracts from the advantage of provided by a composite structure. Finally, such metal coatings are susceptible to galvanic corrosion making them susceptible to structural failures after repeated use.

It would be beneficial to develop new composite structures for applications that require deicing. The present invention satisfies this need and provides related benefits as well.

SUMMARY OF THE INVENTION

In some aspects, embodiments disclosed herein relate to a composite structure that includes a matrix material and a carbon nanotube (CNT)-infused fiber material including a plurality of carbon nanotubes (CNTs) infused to a fiber material. The CNT-infused fiber material is disposed throughout a portion of the matrix material and the composite structure is adapted for application of a current through the CNT-infused fiber material to provide heating of the matrix material to heat the composite structure.

In some aspects, embodiments disclosed herein relate to an article for deicing applications, the article including a plurality of carbon nanotube-infused fibers incorporated in a matrix, thereby forming a composite. The composite is adapted to receive an electrical current and is responsive to the electrical current, operating as a resistive heating element.

In some aspects, embodiments disclosed herein relate to a heating element that includes a CNT-infused fiber material including a plurality of CNTs infused to a fiber material, the CNT-infused fiber material being of sufficient proportions to provide heating to a structure in need thereof.

In some aspects, embodiments disclosed herein relate to a method of deicing or preventing ice formation on a surface of a composite structure that includes: a) providing a composite structure having CNT-infused fiber materials and b) applying a current to the CNT-infused fiber, thereby heating the composite structure.

DETAILED DESCRIPTION

Figure 1:
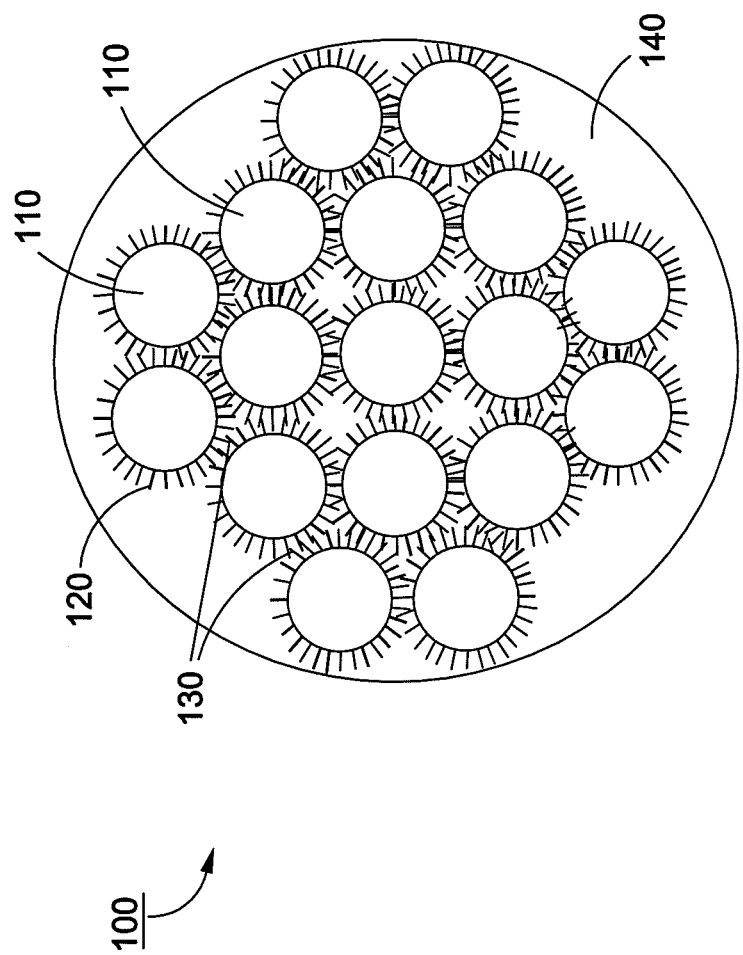
FIG. 1 shows an exemplary carbon nanotube-infused fiber composite for deicing application.

The present invention is directed, in part, to a composite structure for use in deicing applications that includes a matrix material and a carbon nanotube (CNT)-infused fiber material. The CNT-infused fiber material includes a plurality of carbon nanotubes (CNTs) infused to a fiber material. The CNT-infused fiber material can be disposed throughout a portion of the matrix material and the composite structure adapted for application of a current via the CNT-infused fiber material to provide heating of the matrix material to deice or prevent the formation of ice on a surface of the composite structure.

Without being bound by theory, the CNTs of the CNT-infused fiber can alter the conductance of the bulk matrix material by providing percolation conductivity. Percolation conductivity in CNT polymer composites has been modeled (Du et al. Phys. Rev. B 72:121404-1-121404-4, (2005)). In the present invention, the percolation conductance of the composite structures can be the result of CNT-to-CNT point contact, CNT interdigitation/overlap, or combinations thereof as shown in FIGS. 1-4. While the CNTs provide percolation conductance pathways, the fiber carrier to which they are fused provides control of 1) CNT orientation and degree of anisotropy, 2) CNT concentration, and 3) CNT location within the bulk matrix material.

Incorporation of CNTs infused to a fiber, within the composite materials allows for the use of the composite structure itself as a resistive heating element. In this manner, deicing a structure such as the wing, fuselage, or tail assembly of an aircraft (or a helicopter) formed from such composite materials requires no additional heating devices. CNTs are introduced at the fiber level where mass percentages of greater than 3% can be achieved. The CNT-infused fiber material can be used with conventional matrices and can be optionally doped with additional CNTs that are not infused to the fiber to create composite structures. By tailoring the CNT mass percentage present, the resistivity of the structure can be adjusted and controlled to provide the appropriate thermal/conductive properties for using the material as a resistive heating element. The CNT-based composite material can be used as either a surface layer for targeted areas of a structure (such as the wing, fuselage, and tail assembly) or over the entire composite structure, where it can be used to make any article for use in deicing applications. The CNT-infused fiber composite is a composite material that is itself a resistive heating element. The CNT-infused fiber composite can employ any type of fiber substrate, including, for example, carbon, glass, alumina, silicon carbide, or Kevlar. Moreover, since many fiber-types are used in mechanical strengthening applications, the infused CNTs can perform an additional role in enhancing mechanical strength.

The metal spray coating "heater mat" approach employed in the art for deicing applications uses a manufacturing processes that increases cost and complexity, metal spray coatings used over large surface areas of a composite structure can also increase the overall structure weight. Additionally, the use of metal as the resistive heating element brings the risk of galvanic corrosion (which is addressed by using glass layers—a weak interface within the structure), and after repeated use the risk of structure failures. finally, since the metal coating is not an similar material within the composite structure, it can act as a weak point within the composite structure. The incorporation of CNTs in composite structures reduces or eliminates each of these problems. Since traditional composite materials are used with CNTs, the methods for manufacturing the composite structures remain virtually unchanged. Methods used to incorporate CNTs on composite fibers have also been developed that result in low cost material solutions, which combined with the similar manufacturability result in a simple low cost solution (with no weight increase—in fact, weight could be reduced if CNT/fiber materials were used as the structural component as well). Since metals are not used to provide the electrical path, galvanic corrosion is avoided using CNTs. Finally, since the material used to incorporate the CNTs in a fiber, if used as a resistive heating layer, it will not result in a weakening in the overall structure.

As used herein the term "fiber material" refers to any material which has fiber as its elementary structural component. The term encompasses fibers, filaments, yarns, tows, tows, tapes, woven and non-woven fabrics, plies, mats, and similar 3D structures which can be woven or non-woven.

As used herein the term "spoolable dimensions" refers to carbon fiber materials having at least one dimension that is not limited in length, allowing for the material to be stored on a spool or mandrel. Carbon fiber materials of "spoolable dimensions" have at least one dimension that indicates the use of either batch or continuous processing for CNT infusion as described herein. One carbon fiber material of spoolable dimensions that is commercially available is exemplified by AS4 12 k carbon fiber tow with a tex value of 800 (1 tex=1 g/1,000 m) or 620 yard/lb (Grafil, Inc., Sacramento, Calif.). Commercial carbon fiber tow, in particular, can be obtained in 5, 10, 20, 50, and 100 lb. (for spools having high weight, usually a 3 k/12K tow) spools, for example, although larger spools may require special order. Processes of the invention operate readily with 5 to 20 lb. spools, although larger spools are usable. Moreover, a pre-process operation can be incorporated that divides very large spoolable lengths, for example 100 lb. or more, into easy to handle dimensions, such as two 50 lb spools.

As used herein, the term "carbon nanotube" (CNT, plural CNTs) refers to any of a number of cylindrically-shaped allotropes of carbon of the fullerene family including single-walled carbon nanotubes (SWNTs), double-walled carbon nanotubes (DWNTs), multi-walled carbon nanotubes (MWNTs). CNTs can be capped by a fullerene-like structure or open-ended. CNTs include those that encapsulate other materials.

As used herein "uniform in length" refers to length of CNTs grown in a reactor. "Uniform length" means that the CNTs have lengths with tolerances of plus or minus about 20% of the total CNT length or less, for CNT lengths varying from between about 1 micron to about 500 microns. At very short lengths, such as 1-4 microns, this error may be in a range from between about plus or minus 20% of the total CNT length up to about plus or minus 1 micron, that is, somewhat more than about 20% of the total CNT length.

As used herein "uniform in distribution" refers to the consistency of density of CNTs on a carbon fiber material. "Uniform distribution" means that the CNTs have a density on the carbon fiber material with tolerances of plus or minus about 10% coverage defined as the percentage of the surface area of the fiber covered by CNTs. This is equivalent to ±1500 CNTs/$\mu m^2$ for an 8 nm diameter CNT with 5 walls. Such a figure assumes the space inside the CNTs as fillable.

As used herein, the term "infused" means bonded and "infusion" means the process of bonding. Such bonding can involve direct covalent bonding, ionic bonding, pi-pi, and/or van der Waals force-mediated physisorption. For example, in some embodiments, the CNTs can be directly bonded to the carbon fiber material. Bonding can be indirect, such as the CNT infusion to the carbon fiber material via a barrier coating and/or an intervening transition metal nanoparticle disposed between the CNTs and carbon fiber material. In the CNT-infused carbon fiber materials disclosed herein, the carbon nanotubes can be "infused" to the carbon fiber material directly or indirectly as described above. The particular manner in which a CNT is "infused" to a carbon fiber materials is referred to as a "bonding motif."

As used herein, the term "transition metal" refers to any element or alloy of elements in the d-block of the periodic table. The term "transition metal" also includes salt forms of the base transition metal element such as oxides, carbides, nitrides, and the like.

As used herein, the term "nanoparticle" or NP (plural NPs), or grammatical equivalents thereof refers to particles sized between about 0.1 to about 100 nanometers in equivalent spherical diameter, although the NPs need not be spherical in shape. Transition metal NPs, in particular, serve as catalysts for CNT growth on the carbon fiber materials.

As used herein, the term "sizing agent," "fiber sizing agent," or just "sizing," refers collectively to materials used in the manufacture of carbon fibers as a coating to protect the integrity of carbon fibers, provide enhanced interfacial interactions between a carbon fiber and a matrix material in a composite, and/or alter and/or enhance particular physical properties of a carbon fiber. In some embodiments, CNTs infused to carbon fiber materials behave as a sizing agent.

As used herein, the term "matrix material" refers to a bulk material than can serve to organize sized CNT-infused carbon fiber materials in particular orientations, including random orientation. The matrix material can benefit from the presence of the CNT-infused carbon fiber material by imparting some aspects of the physical and/or chemical properties of the CNT-infused carbon fiber material to the matrix material.

As used herein, the term "material residence time" refers to the amount of time a discrete point along a glass fiber material of spoolable dimensions is exposed to CNT growth conditions during the CNT infusion processes described herein. This definition includes the residence time when employing multiple CNT growth chambers.

The composite structure of the present invention can be molded/shaped via a bulk matrix material into numerous structures. For example, the matrix material can be formed into a composite structure that is a portion of an airplane wing, a portion of a helicopter blade, a portion of an aircraft engine propulsor blade. Other applications include use in roads/runways, other plane, aerospace, or auto parts, wind turbine blades, radar structures, and maritime system structures employed in cold weather environments. Structures with moving parts having surface sensitive features in cold weather environments can also employ composites of the present invention. Indeed, the composites of the present invention can be used even where deicing is not the primary concern. For example, composites of the present invention can be used to maintain an elevated operating temperature.

The composite structure of present invention can include a matrix material selected from the group consisting of an epoxy, a phenolic resin, a cement, and a glass. It is of no importance whether the matrix materials on their own are conducting or insulating. The CNT infused fiber material provides resistive heating. Other matrix materials can include, for example, a polyester, a vinylestr, a polyetherimide, a polyetherketoneketone, a polyphthalamide, a polyetherketone, a polyetherketone, a polyimide, and a bis-maleimide. Matrix materials useful in the present invention can include any of the known matrix materials (see Mel M. Schwartz, Composite Materials Handbook (2d ed. 1992)). Matrix materials more generally can include resins (polymers), both thermosetting and thermoplastic, metals, ceramics, and cements.

Thermosetting resins useful as matrix materials include phthalic/maelic type polyesters, vinyl esters, epoxies, phenolics, cyanates, bismaleimides, and nadic end-capped polyimides (e.g., PMR-15). Thermoplastic resins include polysulfones, polyamides, polycarbonates, polyphenylene oxides, polysulfides, polyether ether ketones, polyether sulfones, polyamide-imides, polyetherimides, polyimides, polyarylates, and liquid crystalline polyester.

Metals useful as matrix materials include alloys of aluminum such as aluminum 6061, 2024, and 713 aluminum braze. Ceramics useful as matrix materials include carbon ceramics, such as lithium aluminosilicate, oxides such as alumina and mullite, nitrides such as silicon nitride, and carbides such as silicon carbide. Cements useful as matrix materials include carbide-base cermets (tungsten carbide, chromium carbide, and titanium carbide), refractory cements (tungsten-thoria and barium-carbonate-nickel), chromium-alumina, nickel-magnesia iron-zirconium carbide. Other useful cement materials include, for example, Portland cement which can be used in concrete structures and the like. Cement matrices can be useful, for example, in road deicing applications. In some such embodiments, the CNT-infused fiber material can be supplied with a electrical system integrated, for example, with street lighting systems.

Epoxy and phenolic resins, in particular, can be readily used in the manufacture of numerous parts for deicing as described above. Two exemplary classes of epoxy resins that can be employed in composites of the present invention include glycidyl epoxy and non-glycidyl epoxy resins. The glycidyl epoxies can include a resin system based on a glycidyl-ether, a glycidyl-ester, or a glycidyl-amine. The non-glycidyl epoxies can be aliphatic or cycloaliphatic epoxy resins. Glycidyl epoxies can be prepared via a condensation reaction of a dihydroxy compound, dibasic acid or a diamine and epichlorohydrin. Non-glycidyl epoxies can be formed by peroxidation of olefinic double bond. Glycidyl-ether epoxies include, for example, diglycidyl ether of bisphenol-A (DGEBA) and novolac epoxy resins. DGEBA is a typical commercial epoxy resin and is synthesized by reacting bisphenol-A with epichlorohydrin in presence of a basic catalyst. Novolac epoxy resins are glycidyl ethers of phenolic novolac resins, an exemplary phenolic resin. Phenols are reacted in excess, with formaldehyde in presence of acidic catalyst to produce phenolic novolac resin. Novolac epoxy resins can be synthesized by reacting phenolic novolac resin with epichlorohydrin in presence of sodium hydroxide as a catalyst.

The composite structures of the present invention can include CNT infused fiber materials based on glass, carbon, ceramic, metals, and organic materials such as aramids. As with the matrix material, the base fiber material can be insulating or conducting. The CNTs provide the requisite resistive heating. However, the role of the fiber material is integral to the organization of the CNTs throughout the composite structure.

In some embodiments, the CNT-infused fiber material includes a glass fiber material. CNT-infused glass fiber materials need not incorporate a barrier coating as described above, although one can be optionally employed. The glass-type used in the glass fiber material can be any type, including for example, E-glass, A-glass, E-CR-glass, C-glass, D-glass, R-glass, and S-glass. E-glass includes alumino-borosilicate glass with less than 1% by weight alkali oxides and is mainly used for glass-reinforced plastics. A-glass includes alkali-lime glass with little or no boron oxide. E-CR-glass includes alumino-lime silicate with less than 1% by weight alkali oxides and has high acid resistance. C-glass includes alkali-lime glass with high boron oxide content and is used, for example, for glass staple fibers. D-glass includes borosilicate glass and possesses a high dielectric constant. R-glass includes alumino silicate glass without MgO and CaO and possesses high mechanical strength. S-glass includes alumino silicate glass without CaO but with high MgO content and possesses high tensile strength. One or more of these glass types can be processed into the glass fiber materials described above. In particular embodiments, the glass is E-glass. In other embodiments, the glass is S-glass.

There are three types of carbon fiber which are categorized based on the precursors used to generate the fibers, any of which can be used in the invention: Rayon, Polyacrylonitrile (PAN) and Pitch. Carbon fiber from rayon precursors, which are cellulosic materials, has relatively low carbon content at about 20% and the fibers tend to have low strength and stiffness. Polyacrylonitrile (PAN) precursors provide a carbon fiber with a carbon content of about 55%. Carbon fiber based on a PAN precursor generally has a higher tensile strength than carbon fiber based on other carbon fiber precursors due to a minimum of surface defects.

Pitch precursors based on petroleum asphalt, coal tar, and polyvinyl chloride can also be used to produce carbon fiber. Although pitches are relatively low in cost and high in carbon yield, there can be issues of non-uniformity in a given batch.

In some embodiments, if the CNT-infused fiber material includes a ceramic fiber material. The ceramic-type used in a ceramic fiber material can be any type, including for example, oxides such as alumina and zirconia, carbides, such as boron carbide, silicon carbide, and tungsten carbide, and nitrides, such as boron nitride and silicon nitride. Other ceramic fiber materials include, for example, borides and silicides. Ceramic fibers can also include basalt fiber materials. Ceramic fiber materials may occur as composite materials with other fiber types. It is common to find fabric-like ceramic fiber materials that also incorporate glass fiber, for example.

The composites of the invention can incorporate fiber materials in the form of tows, rovings, tapes, yarns, braids, fabrics and other 3D woven structures. While various mats, woven and non-woven fabrics and the like can also be functionalized by processes described herein, it is also possible to generate such higher ordered structures from the parent tow, yarn or the like after CNT functionalization of these parent materials. For example, a CNT-infused woven fabric can be generated from a CNT-infused fiber tow.

CNTs useful for infusion to carbon fiber materials include single-walled CNTs, double-walled CNTs, multi-walled CNTs, and mixtures thereof. The exact CNTs to be used depends on the application of the CNT-infused carbon fiber. CNTs can be used for thermal and/or electrical conductivity applications, or as insulators. In some embodiments, the infused carbon nanotubes are single-wall nanotubes. In some embodiments, the infused carbon nanotubes are multi-wall nanotubes. In some embodiments, the infused carbon nanotubes are a combination of single-wall and multi-wall nanotubes. There are some differences in the characteristic properties of single-wall and multi-wall nanotubes that, for some end uses of the fiber, dictate the synthesis of one or the other type of nanotube. For example, single-walled nanotubes can be semi-conducting or metallic, while multi-walled nanotubes are metallic.

Composites having CNT-infused fiber materials are provided in which the CNTs are substantially uniform in length. In the continuous process described herein below, the residence time of the fiber material in a CNT growth chamber can be modulated to control CNT growth and ultimately, CNT length. This provides a means to control specific properties of the CNTs grown. CNT length can also be controlled through modulation of the carbon feedstock and carrier gas flow rates and reaction temperature. Additional control of the CNT properties can be obtained by controlling, for example, the size of the catalyst used to prepare the CNTs. For example, 1 nm transition metal nanoparticle catalysts can be used to provide SWNTs in particular. Larger catalysts can be used to prepare predominantly MWNTs.

Additionally, the CNT growth processes described below are useful for providing a CNT-infused fiber material with uniformly distributed CNTs on the fiber materials while avoiding bundling and/or aggregation of the CNTs that can occur in processes in which pre-formed CNTs are suspended or dispersed in a solvent solution and applied by hand to the fiber material. Such aggregated CNTs tend to adhere weakly to a fiber material and the characteristic CNT properties are weakly expressed, if at all. In some embodiments, the maximum distribution density, expressed as percent coverage, that is, the surface area of fiber covered, can be as high as about 55% assuming about 8 nm diameter CNTs with 5 walls. This coverage is calculated by considering the space inside the CNTs as being "fillable" space. Various distribution/density values can be achieved by varying catalyst dispersion on the surface as well as controlling gas composition and process speed. Typically for a given set of parameters, a percent coverage within about 10% can be achieved across a fiber surface. Higher density and shorter CNTs are useful for improving mechanical properties, while longer CNTs with lower density are useful for improving thermal and electrical properties, although increased density is still favorable. A lower density can result when longer CNTs are grown. This can be the result of the higher temperatures and more rapid growth causing lower catalyst particle yields.

CNTs lend their characteristic properties such as mechanical strength, low to moderate electrical resistivity, high thermal conductivity, and the like to the CNT-infused fiber material. For example, in some embodiments, the electrical resistivity of a carbon nanotube-infused carbon fiber material is lower than the electrical resistivity of a parent carbon fiber material. More generally, the extent to which the resulting CNT-infused fiber expresses these characteristics can be a function of the extent and density of coverage of the carbon fiber by the carbon nanotubes. Any amount of the fiber surface area, from 0-55% of the fiber can be covered assuming an 8 nm diameter, 5-walled MWNT (again this calculation counts the space inside the CNTs as fillable). This number is lower for smaller diameter CNTs and more for greater diameter CNTs. 55% surface area coverage is equivalent to about 15,000 CNTs/micron$^2$. Further CNT properties can be imparted to the fiber material in a manner dependent on CNT length, as described above. Infused CNTs can vary in length ranging from between about 1 micron to about 500 microns, including 1 micron, 2 microns, 3 microns, 4 micron, 5, microns, 6, microns, 7 microns, 8 microns, 9 microns, 10 microns, 15 microns, 20 microns, 25 microns, 30 microns, 35 microns, 40 microns, 45 microns, 50 microns, 60 microns, 70 microns, 80 microns, 90 microns, 100 microns, 150 microns, 200 microns, 250 microns, 300 microns, 350 microns, 400 microns, 450 microns, 500 microns, and all values in between. CNTs can also be less than about 1 micron in length, including about 0.5 microns, for example. CNTs can also be greater than 500 microns, including for example, 510 microns, 520 microns, 550 microns, 600 microns, 700 microns and all values in between.

Composites of the invention can incorporate CNT-infused fibers with CNTs that have a length from about 1 micron to about 10 microns. Such CNT lengths can be useful in application to increase shear strength. CNTs can also have a length from about 5 to about 70 microns. Such CNT lengths can be useful in applications for increased tensile strength if the CNTs are aligned in the fiber direction. CNTs can also have a length from about 10 microns to about 100 microns. Such CNT lengths can be useful to increase electrical/thermal properties as well as mechanical properties. The process used in the invention can also provide CNTs having a length from about 100 microns to about 500 microns, which can also be beneficial to increase electrical and thermal properties. Such control of CNT length is readily achieved through modulation of carbon feedstock and inert gas flow rates coupled with varying linespeeds and growth temperature.

In some embodiments, compositions that include spoolable lengths of CNT-infused carbon fiber materials can have various uniform regions with different lengths of CNTs. For example, it can be desirable to have a first portion of CNT-infused carbon fiber material with uniformly shorter CNT lengths to enhance shear strength properties, and a second portion of the same spoolable material with a uniform longer CNT length to enhance electrical or thermal properties. In this manner, composite structures can be designed to have a surface structure designed for deicing applications, while having a main body with shorter CNTs for increased mechanical strength. The continuous CNT synthesis of spoolable fiber materials facilitates composite design and streamlines processing.

In some embodiments, the composite structures of the present invention can further include a plurality of "loose" CNTs dispersed throughout the matrix material. By "loose," it is meant CNTs are introduced into the matrix material without infusion to the fiber material. This can be useful to further increase percolation pathways, for example. "Loose" CNTs can be used to enhance or fine tune the resulting nanocomposite structure's electrical conductivity. Doping the matrix with large amounts of loose CNTs can increase percolation pathways, further increasing composite conductivity. Fewer loose CNTs reduces percolation pathways for decreased conductivity. The conductivity of the nanocomposite structure can be precisely controlled with loose CNTs resulting in specific resistances which can be tailored depending on the power of heating targeted by the system, including deicing systems.

In some embodiments, a range of resistivities can be achieved through the use of CNT-infused fibers alone, or in combination with loose CNTs. For example, CNT-infused carbon fiber can provide resistivities of less than about 10 ohm-meters, including without limitation, less than 10, 9, 8, 7, 6, 5, 4, 3, 2, 1, 0.5, or 0.1 ohm-meters, and any value in between. Glass fibers can provide in a wider array of resistivities from $10^5$ ohm-meters to as low as less than 0.1 ohm meters, including without limitation, $10^5$, $10^4$, $10^3$, 100, 50, 20, 10, 5, 4, 3, 2, 1, 0.5, or 0.1 ohm-meters, and any value in between. Resistivities can be tailored depending on the desired resistance for a structure of a given size. Tailoring resistivity can be accomplished by at least the following factors: 1) choice of CNT-infused fiber type as exemplified by the differences between glass and carbon fibers shown above, 2) the amount of each CNT-infused fiber, 3) the density of CNTs infused to the fiber, and 4) the optional use of loose CNTs, including, for example, metallic SWNTs, MWNTs, or the like.

The composite structures of the present invention can be readily adapted for application of a current through said CNT-infused fiber material to provide heating of the matrix material to deice or prevent the formation of ice on a surface of the composite structure. In some embodiments, the supplied current is a DC current at a voltage from between about <1 to about 24 volts. In other embodiments, the supplied current is an AC current at a voltage from between about 60 to about 480 volts. The CNT-infused fiber material of a composite can be connected to a lead which supplies either type of current. In some embodiments, the connection to a power source can be integrated with existing electrical systems, for example, in an aircraft.

In some embodiments, the present invention provides a heating element that includes a CNT-infused fiber material that includes a plurality of CNTs infused to a fiber material, the CNT-infused fiber material providing resistive heating. In some such embodiments the heating CNT-infused fiber material can be disposed throughout a portion of a matrix material. As a heating element the fiber material can be supplied as a filamentous structure selected from the group consisting of a tow, a yarn, a tape, a ribbon and can be made of a material selected from the group consisting of carbon, glass, ceramic, and organic as described herein above.

In some embodiments, the heating element does not need to include a matrix material. For example, the CNT-infused fiber material on its own can be used as a naked heating element. Such a heating element converts electricity into heat through the process of Joule heating. Electric current through the element encounters resistance, resulting in heating of the element. Heating elements of the present invention can function in a manner similar to known heating elements such as nichrome wire, ribbon, or strip. The heating element employing CNT-infused fiber can be wire or ribbon, straight or coiled. Heating elements of the invention can be used in numerous commercial products such as toasters, hair dryers, furnaces for industrial heating, floor heating, roof heating, pathway heating to melt snow, and in dryers, for example.

The aforementioned composites and heating elements of the present invention can be used in a method of deicing or preventing ice formation on a surface of a composite structure. Such methods include providing a composite structure or heating element as described above and applying a current to the CNT-infused fiber, thereby generating resistive heating. As described above, the application of current can be in the form of a DC or AC current.

In some embodiments, the present invention provides an article for deicing applications, the article including a plurality of carbon nanotube-infused fibers incorporated in a matrix, thereby forming a composite. The composite is adapted to receive an electrical current and is responsive to the electrical current, operating as a resistive heating element. The article is optionally doped with loose carbon nanotubes throughout the matrix.

An exemplary embodiment of article includes an aircraft surface that includes a (CNT)-infused fiber composite. It has been indicated that carbon nanotubes are good thermal conductors at least along the axis of the carbon nanotubes, appropriate for such applications. A carbon nanotube is theoretically predicted as being capable of transmitting up to about 6000 Watts per meter per Kelvin at room temperature, which is over 15 times greater than the thermal transmission capacity of metals such as copper. It has also been indicated that carbon nanotubes, particularly single walled carbon nanotubes, can be good electrical conductors, depending on the structure of the nanotubes. For example, an "armchair" nanotube, having a chiral vector (n,m), wherein n=m, is metallic and can theoretically carry an electrical current density of about $4*10^9$ Amperes per square centimeter ($A/cm^2$), which is over 1000 times greater than the current carrying capacity of metals such as copper. Multi-walled carbon nanotubes are also known to be good conductors.

In one configuration, an article includes a CNT-infused fiber composite having CNT-infused fibers impregnated in a matrix. Such CNT-infused fibers may be grown using one or more of techniques described here and further below. A fiber tow, which includes up to about 12,000 fibers, can be delivered to a fiber spreader station, which separates the fibers. The fibers then enter a fiber surface modification station for "roughing" the surface of the fibers to facilitate catalyst deposition. After surface modification, catalyst is applied to the fibers. Carbon nanotube synthesis occurs in a CNT-growth chamber, wherein the catalyst-laden fibers are first heated. After heating, in an exemplary chemical vapor deposition process, the fibers are ready to receive carbon feed gas. As a consequence of the exposure of the catalyst to the carbon feed gas, carbon nanotubes grow or are "infused" on the fibers.

Referring now to FIG. 1, there is illustrated schematically a cross-sectional view of a composite material 100, according to a first embodiment of the invention. Composite material 100 is suitable for fabricating structures such as aerodynamic surface structures including the wing, fuselage and tail assembly of aircraft (including helicopters), having desirable thermal and electrical characteristics. Enhanced electrical conductivity of composite material 100 ensures effective conduction of electrical currents which may be used for resistive heating applications. Similarly, enhanced thermal conductivity of composite material 100 ensures that heat generated by passage of electrical currents is effectively transmitted to the surface of composite material 100. Composite material 100 includes a plurality of fibers or filaments 110 in a matrix 140. Fibers 110 are infused with carbon nanotubes 120. In an exemplary embodiment, fibers 110 may be glass (e.g., E-glass, S-glass, D-glass) fibers. In another embodiment, fibers 110 may be carbon (graphite) fibers. Other fibers such as polyamide (Aromatic polyamide, Aramid) (e.g., Kevlar 29 and Kevlar 49), metallic fiber (e.g., steel, aluminum, molybdenum, tantalum, titanium, and tungsten), tungsten monocarbide, ceramic fiber, metallic-ceramic fiber (e.g., aluminum silica), cellulosic fiber, polyester, quartz, and silicon carbide may also be used.

In an exemplary embodiment, carbon nanotubes 120 may be grown generally on the outer surface of fiber 110. Carbon nanotubes 120 may be grown in situ on fibers 110. For example, a glass fiber 110 may be fed through a growth chamber maintained at a given temperature of about 500° to 750° C. Carbon containing feed gas is then introduced into the growth chamber, wherein carbon radicals dissociate and initiate formation of carbon nanotubes on the glass fiber, in presence of the catalyst nanoparticles.

In one configuration, to create composite material 100, CNT-infused fibers 110 are delivered to a resin bath. In another configuration, a fabric may be woven from CNT-infused fibers 110 and the fabric is delivered to a resin bath. The resin bath contains resin for the production of composite material 100 comprising CNT-infused fibers 110 and matrix 140. In one configuration, matrix 140 may take the form of an epoxy resin matrix. In another configuration, matrix 140 can be one of general purpose polyester (such as orthophthalic polyesters), improved polyester (such as isophthalic polyesters), phenolic resin, polyurethane, and vinyl ester. Matrix 140 can also take the form of a non-resin matrix (for example, a ceramic matrix) useful for applications requiring performance at higher operational temperatures, such as aerospace and/or military related applications. It will be understood that matrix 140 can also take the form of a metal matrix.

Known composite manufacturing methods such as vacuum assisted resin infusion method and resin extrusion method for impregnating CNT-infused fibers 110, or a fabric woven therefrom, with a resin matrix may be utilized. For example, CNT-infused fibers 110, or a fabric woven therefrom, may be laid in a mold and resin may be infused therein. In another configuration, CNT-infused fibers 110, or a fabric woven therefrom, may be laid in a mold, which is then evacuated to pull the resin therethrough. In another configuration, CNT-infused fibers 110 may be woven in a "0/90" orientation by winding, that is, a first layer or panel of CNT-infused fibers 100 is wound in one direction (say, at about 0°) and a second layer or panel of CNT-infused fibers 110 is wound in another direction which is orthogonal (i.e., at about 90°) to the first layer or panel. It is believed that, in an "0/90" orientation, composite 100 may have improved interdigitation of carbon nanotubes 120, resulting in improved thermal conductivity of composite 100.

Fibers 110 infused with carbon nanotubes 120 are incorporated in a thermoset plastic matrix (e.g., an epoxy resin matrix) 140 to create composite material 100. The methods for incorporating fibers in a matrix are well known in the art and therefore are not described in further detail. In one configuration, CNT-infused fibers 110 may be incorporated in matrix 140 using a high pressure curing method. It has been indicated that CNT loading of a composite signifies the weight percentage of carbon nanotubes in a given composite. Most processes for producing CNT-based composites involve direct mixing of the carbon nanotubes into the resin/matrix of the nascent composite. The composites resulting from such processes are limited to a maximum of about five (5) weight percent of carbon nanotubes in the finished composite material. Composite material 100, on the other hand, may have a CNT loading in excess of 25 weight %. Using CNT-infused fibers 110, composite materials having CNT loading as high as 60 weight percent have been demonstrated. The heat generating capacity of a material via resistive heating depends on its electrical conductivity. Overall electrical conductivity of composite 100 is, at least in part, a function of the CNT loading of composite 100. Thus, heat generating capacity of composite 100 is, at least in part, a function of the CNT loading of composite 100. Likewise, heat transfer effectiveness of a material depends on its thermal conductivity. Overall thermal conductivity of composite 100 is, at least in part, a function of the CNT loading of composite 100. Thus, heat transfer effectiveness of composite 100 is, at least in part, a function of the CNT loading of composite 100. High CNT loading of composite 100, therefore, enhances the heat generating capacity due to resistive heating as well as heat transfer effectiveness of composite 100. The conductivity of composite 100 may be tailored to a given requirement by adjusting the CNT weight percentage of composite 100.

The above-described composite material 100 with CNT-infused fibers incorporated therein is suitable for fabricating structures with desirable electrical and thermal characteristics, for deicing applications, for example. It is also contemplated that composite material 100 may be used fabricate wing structures of aircrafts, or components thereof, radar structures, and other structures which may be exposed to the environment and whose operation may be adversely affected by undesirable accumulation of ice thereon.

Composite structures which are useful, for example, for their weight and strength characteristics, are sometimes not suitable for deicing applications because of their relatively poor thermal conductivity. Such composites may be coated with metallic sprays to improve their thermal conductivity. However, such measures can increase the weight, complexity and costs (for metal reinforced composites, for example) and susceptibility to damage due to galvanic corrosion. Composite 100 with CNT-infused fibers 110 obviates the requirements for metallic sprays, while retaining the useful characteristics associated with composite materials. Furthermore, composite 100 eliminates the need for separate resistive heating elements because composite 100 itself is configured to operate as a resistive heating element.

Figure 2:
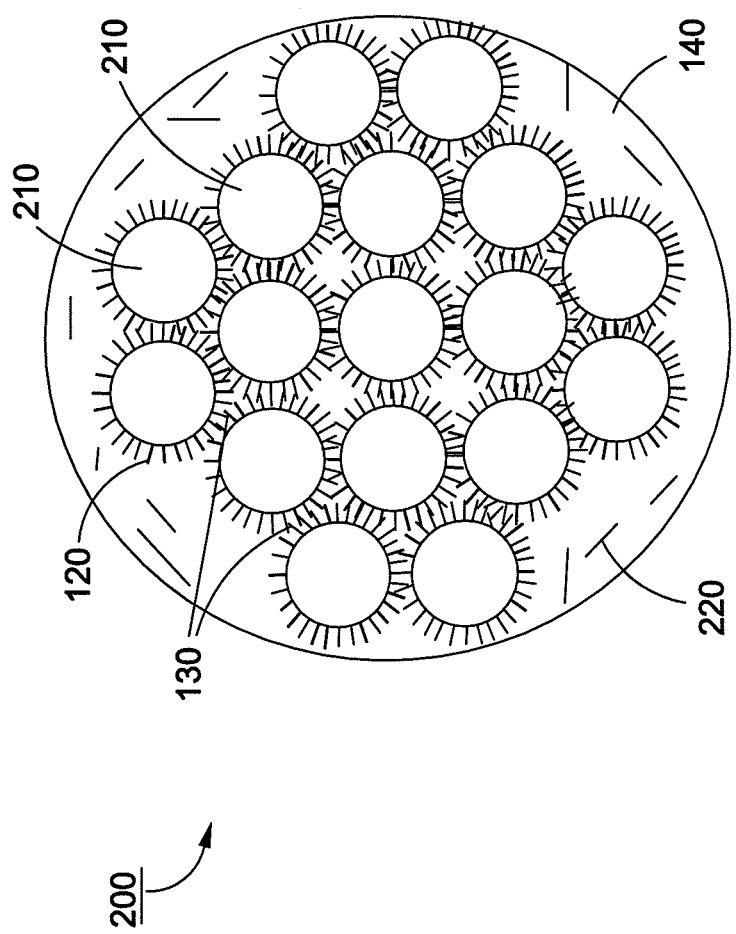
FIG. 2 shows an exemplary carbon nanotube-infused fiber composite with a doped matrix.

Referring now to FIG. 2, there is illustrated schematically a cross-sectional view of a composite material 200, according to a another embodiment of the invention. CNT-infused fiber composite 200 is generally similar to composite 100 and includes a plurality of fibers 210 and a matrix 140. In some such embodiments, matrix 140 is doped with carbon nanotubes 220. In one configuration, matrix 140 can be a resin matrix. Other matrix materials as described herein can also be used. Doping matrix 140 with carbon nanotubes 220 further enhances the thermal conductivity and electrical conductivity of matrix 140 and as a result of overall composite 200.

Figure 3:
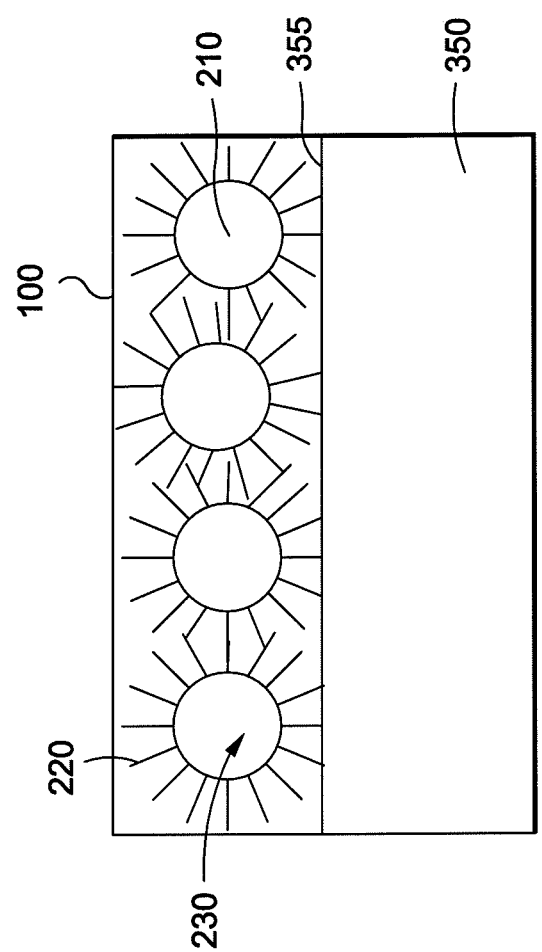
FIG. 3 shows an exemplary carbon nanotube-infused fiber composite coating applied on a composite for deicing applications.

Referring now to FIG. 3, there is illustrated schematically a coating layer of CNT-infused fiber composite 100 disposed on a top surface 355 of a composite material 350. In one configuration, composite 350 can take the form of a conventional composite glass or glass-reinforced plastic. In another configuration, composite 350 can take the form of a carbon fiber composite structure or a carbon fiber reinforced plastic structure. Composite 350, on its own, is generally not suitable for use in deicing applications which uses good electrical and thermal conductivities. However, by applying a coating or layer 100 including CNT-infused fibers 210 onto surface 355 of composite 350, the combination (i.e., the combination of composite 350 and CNT-infused fiber composite 100) exhibits significantly enhanced electrical and thermal conductivities.

In one configuration, CNT-infused fibers 210 may be woven to form a fabric. In one configuration, coating of fibers 210 may have a thickness ranging from about 20 nanometers (nm) to about 12.5 millimeters (mm). While the illustrated embodiment depicts a single layer of fibers 210 for the sake of simplicity, it will be understood that multiple layers of fibers 210 can be used to form a coating on composite 350. It will further be understood that a coating or layer of CNT-infused fiber composite 200 (with matrix 140 doped with carbon nanotubes) can also be utilized in conjunction with a conventional composite structure for deicing applications.

An advantage of using CNT-infused fiber composite 100 as a coating on another composite is that the coating of CNT infused fiber composite 100 enables the use of materials having poor thermal and/or electrical conductivities for deicing applications while retaining their advantages in terms of weight and strength and other desirable characteristics.

Figure 4:
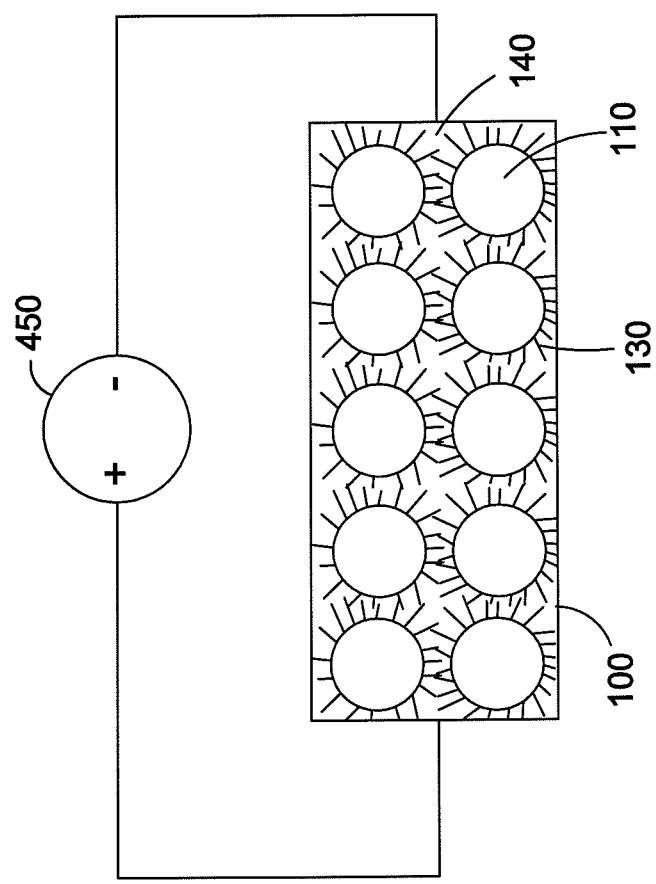
FIG. 4 shows an exemplary carbon nanotube-infused fiber composite adapted to operate as a resistive heating element, according to an embodiment of the invention.

Referring now to FIG. 4, there is illustrated CNT-infused fiber composite 100 configured for deicing applications. A voltage source 450 is electrically coupled to composite 100 through CNT infused fiber electrodes 540a and 540b to generate electrical current through composite 100. Electrical current flowing through CNT-infused fibers 110 and associated carbon nanotubes 130 generate heat due to resistive heating. The heat generated is effectively transferred to the surface of composite 100 by CNT-infused fibers 110 at discrete locations just above CNT infused fibers 110. The spacing of CNT-infused fibers 110 can be adjusted to provide varying levels of heating. This distance between CNT infused fibers 110 can range between 0.25 to greater than 2 inches. Composite 100 obviate the need for separate resistive heating elements.

Figure 5:
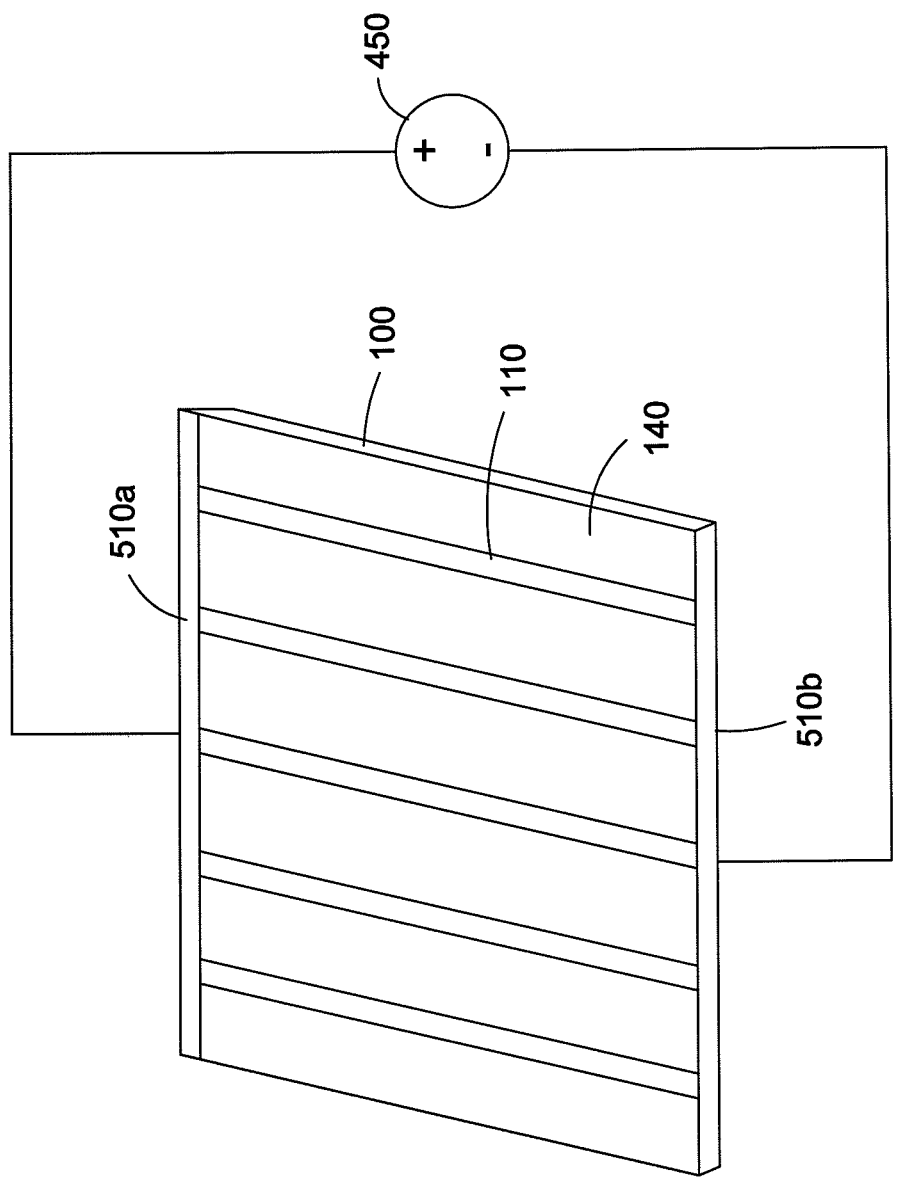
FIG. 5 shows an exemplary carbon nanotube-infused fiber composite configured in conductive strips adapted to operate as a resistive heating element, according to an embodiment of the invention.

Referring now to FIG. 5, there is illustrated CNT-infused fiber composite 100 configured for deicing applications. It will be understood that composite 200 may be similarly configured for deicing applications. A voltage source 450 is electrically coupled to composite 100 to generate electrical current through composite 100. Electrical current flowing through CNT-infused fibers 110 and associated carbon nanotubes 130 generate heat due to resistive heating. The heat generated is effectively transferred to the surface of composite 100 by CNT-infused fibers 110 and associated carbon nanotubes 130 (and carbon nanotubes 220, in case of composite 200). Composites 100, 200 obviate the need for separate resistive heating elements.

An exemplary CNT-infused fiber material is carbon nanotube-infused ("CNT-infused") carbon fiber materials. The following discussion with respect to carbon fiber materials is merely exemplary. Given the teachings and guidance provided herein with respect to carbon fiber materials, one skilled in the art will recognize the ability to utilize the processes described herein to manufacture other CNT infused fiber materials, including glass fiber materials, ceramic fiber materials, metal fiber materials, and organic fiber materials, including without limitation, aramid fibers, cellulosic fiber materials, and other natural and synthetic organic fibers.

CNTs infused on a carbon fiber material can alter various properties of the carbon fiber material, such as thermal and/or electrical conductivity, and/or tensile strength, for example. The processes employed to make CNT-infused carbon fiber materials provide CNTs with substantially uniform length and distribution to impart their useful properties uniformly over the carbon fiber material that is being modified. Furthermore, the processes disclosed herein are suitable for the generation of CNT-infused carbon fiber materials of spoolable dimensions.

The present disclosure describes a processes for making CNT-infused carbon fiber materials. The processes disclosed herein can be applied to nascent carbon fiber materials generated de novo before, or in lieu of, application of a typical sizing solution to the carbon fiber material. Alternatively, the processes disclosed herein can utilize a commercial carbon fiber material, for example, a carbon tow, that already has a sizing applied to its surface. In such embodiments, the sizing can be removed to provide a direct interface between the carbon fiber material and the synthesized CNTs, although a barrier coating and/or transition metal particle can serve as an intermediate layer providing indirect infusion, as explained further below. After CNT synthesis further sizing agents can be applied to the carbon fiber material as desired.

In some embodiments, the present invention provides a composite that includes a carbon nanotube (CNT)-infused carbon fiber material. The CNT-infused carbon fiber material includes a carbon fiber material of spoolable dimensions, a barrier coating conformally disposed about the carbon fiber material, and carbon nanotubes (CNTs) infused to the carbon fiber material. The infusion of CNTs to the carbon fiber material can include a bonding motif of direct bonding of individual CNTs to the carbon fiber material or indirect bonding via a transition metal NP, barrier coating, or both.

Without being bound by theory, transition metal NPs, which serve as a CNT-forming catalyst, can catalyze CNT growth by forming a CNT growth seed structure. In one embodiment, the CNT-forming catalyst can remain at the base of the carbon fiber material, locked by the barrier coating, and infused to the surface of the carbon fiber material. In such a case, the seed structure initially formed by the transition metal nanoparticle catalyst is sufficient for continued non-catalyzed seeded CNT growth without allowing the catalyst to move along the leading edge of CNT growth, as often observed in the art. In such a case, the NP serves as a point of attachment for the CNT to the carbon fiber material. The presence of the barrier coating can also lead to further indirect bonding motifs. For example, the CNT forming catalyst can be locked into the barrier coating, as described above, but not in surface contact with carbon fiber material. In such a case a stacked structure with the barrier coating disposed between the CNT forming catalyst and carbon fiber material results. In either case, the CNTs formed are infused to the carbon fiber material. In some embodiments, some barrier coatings will still allow the CNT growth catalyst to follow the leading edge of the growing nanotube. In such cases, this can result in direct bonding of the CNTs to the carbon fiber material or, optionally, to the barrier coating. Regardless of the nature of the actual bonding motif formed between the carbon nanotubes and the carbon fiber material, the infused CNT is robust and allows the CNT-infused carbon fiber material to exhibit carbon nanotube properties and/or characteristics.

Again, without being bound by theory, when growing CNTs on carbon fiber materials, the elevated temperatures and/or any residual oxygen and/or moisture that can be present in the reaction chamber can damage the carbon fiber material. Moreover, the carbon fiber material itself can be damaged by reaction with the CNT-forming catalyst itself. That is the carbon fiber material can behave as a carbon feedstock to the catalyst at the reaction temperatures employed for CNT synthesis. Such excess carbon can disturb the controlled introduction of the carbon feedstock gas and can even serve to poison the catalyst by overloading it with carbon. The barrier coating employed in the invention is designed to facilitate CNT synthesis on carbon fiber materials. Without being bound by theory, the coating can provide a thermal barrier to heat degradation and/or can be a physical barrier preventing exposure of the carbon fiber material to the environment at the elevated temperatures. Alternatively or additionally, it can minimize the surface area contact between the CNT-forming catalyst and the carbon fiber material and/or it can mitigate the exposure of the carbon fiber material to the CNT-forming catalyst at CNT growth temperatures.

The compositions of the invention having CNT-infused carbon fiber materials can include a carbon fiber material such as a carbon filament, a carbon fiber yarn, a carbon fiber tow, a carbon tape, a carbon fiber-braid, a woven carbon fabric, a non-woven carbon fiber mat, a carbon fiber ply, and other 3D woven structures. Carbon filaments include high aspect ratio carbon fibers having diameters ranging in size from between about 1 micron to about 100 microns. Carbon fiber tows are generally compactly associated bundles of filaments and are usually twisted together to give yarns.

Yarns include closely associated bundles of twisted filaments. Each filament diameter in a yarn is relatively uniform. Yarns have varying weights described by their 'tex,' expressed as weight in grams of 1000 linear meters, or denier, expressed as weight in pounds of 10,000 yards, with a typical tex range usually being between about 200 tex to about 2000 tex.

Tows include loosely associated bundles of untwisted filaments. As in yarns, filament diameter in a tow is generally uniform. Tows also have varying weights and the tex range is usually between 200 tex and 2000 tex. They are frequently characterized by the number of thousands of filaments in the tow, for example 12K tow, 24K tow, 48K tow, and the like.

Carbon tapes are materials that can be assembled as weaves or can represent non-woven flattened tows. Carbon tapes can vary in width and are generally two-sided structures similar to ribbon. Processes of the present invention are compatible with CNT infusion on one or both sides of a tape. CNT-infused tapes can resemble a "carpet" or "forest" on a flat substrate surface. Again, processes of the invention can be performed in a continuous mode to functionalize spools of tape.

Carbon fiber-braids represent rope-like structures of densely packed carbon fibers. Such structures can be assembled from carbon yarns, for example. Braided structures can include a hollow portion or a braided structure can be assembled about another core material.

In some embodiments a number of primary carbon fiber material structures can be organized into fabric or sheet-like structures. These include, for example, woven carbon fabrics, non-woven carbon fiber mat and carbon fiber ply, in addition to the tapes described above. Such higher ordered structures can be assembled from parent tows, yarns, filaments or the like, with CNTs already infused in the parent fiber. Alternatively such structures can serve as the substrate for the CNT infusion processes described herein.

Processes of the invention for CNT infusion to carbon fiber materials allow control of the CNT lengths with uniformity and in a continuous process allowing spoolable carbon fiber materials to be functionalized with CNTs at high rates. With material residence times between 5 to 300 seconds, linespeeds in a continuous process for a system that is 3 feet long can be in a range anywhere from about 0.5 ft/min to about 36 ft/min and greater. The speed selected depends on various parameters as explained further below.

In some embodiments, a material residence time of about 5 to about 30 seconds can produce CNTs having a length between about 1 micron to about 10 microns. In some embodiments, a material residence time of about 30 to about 180 seconds can produce CNTs having a length between about 10 microns to about 100 microns. In still further embodiments, a material residence time of about 180 to about 300 seconds can produce CNTs having a length between about 100 microns to about 500 microns. One skilled in the art will recognize that these ranges are approximate and that CNT length can also be modulated by reaction temperatures, and carrier and carbon feedstock concentrations and flow rates.

CNT-infused carbon fiber materials of the invention include a barrier coating. Barrier coatings can include for example an alkoxysilane, methylsiloxane, an alumoxane, alumina nanoparticles, spin on glass and glass nanoparticles. As described below, the CNT-forming catalyst can be added to the uncured barrier coating material and then applied to the carbon fiber material together. In other embodiments the barrier coating material can be added to the carbon fiber material prior to deposition of the CNT-forming catalyst. The barrier coating material can be of a thickness sufficiently thin to allow exposure of the CNT-forming catalyst to the carbon feedstock for subsequent CVD growth. In some embodiments, the thickness is less than or about equal to the effective diameter of the CNT-forming catalyst. In some embodiments, the thickness of the barrier coating is in a range from between about 10 nm to about 100 nm. The barrier coating can also be less than 10 nm, including 1 nm, 2 nm, 3 nm, 4 nm, 5 nm, 6 nm, 7 nm, 8 nm, 9 nm, 10 nm, and any value in between.

Without being bound by theory, the barrier coating can serve as an intermediate layer between the carbon fiber material and the CNTs and serves to mechanically infuse the CNTs to the carbon fiber material. Such mechanical infusion still provides a robust system in which the carbon fiber material serves as a platform for organizing the CNTs while still imparting properties of the CNTs to the carbon fiber material. Moreover, the benefit of including a barrier coating is the immediate protection it provides the carbon fiber material from chemical damage due to exposure to moisture and/or any thermal damage due to heating of the carbon fiber material at the temperatures used to promote CNT growth.

The infused CNTs disclosed herein can effectively function as a replacement for conventional carbon fiber "sizing." The infused CNTs are more robust than conventional sizing materials and can improve the fiber-to-matrix interface in composite materials and, more generally, improve fiber-to-fiber interfaces. Indeed, the CNT-infused carbon fiber materials disclosed herein are themselves composite materials in the sense the CNT-infused carbon fiber material properties will be a combination of those of the carbon fiber material as well as those of the infused CNTs. Consequently, embodiments of the present invention provide a means to impart desired properties to a carbon fiber material that otherwise lack such properties or possesses them in insufficient measure. Carbon fiber materials can be tailored or engineered to meet the requirements of specific applications. The CNTs acting as sizing can protect carbon fiber materials from absorbing moisture due to the hydrophobic CNT structure. Moreover, hydrophobic matrix materials, as further exemplified below, interact well with hydrophobic CNTs to provide improved fiber to matrix interactions.

Despite the beneficial properties imparted to a carbon fiber material having infused CNTs described above, the compositions of the present invention can include further "conventional" sizing agents. Such sizing agents vary widely in type and function and include, for example, surfactants, anti-static agents, lubricants, siloxanes, alkoxysilanes, aminosilanes, silanes, silanols, polyvinyl alcohol, starch, and mixtures thereof. Such secondary sizing agents can be used to protect the CNTs themselves or provide further properties to the fiber not imparted by the presence of the infused CNTs.

Figure 6:
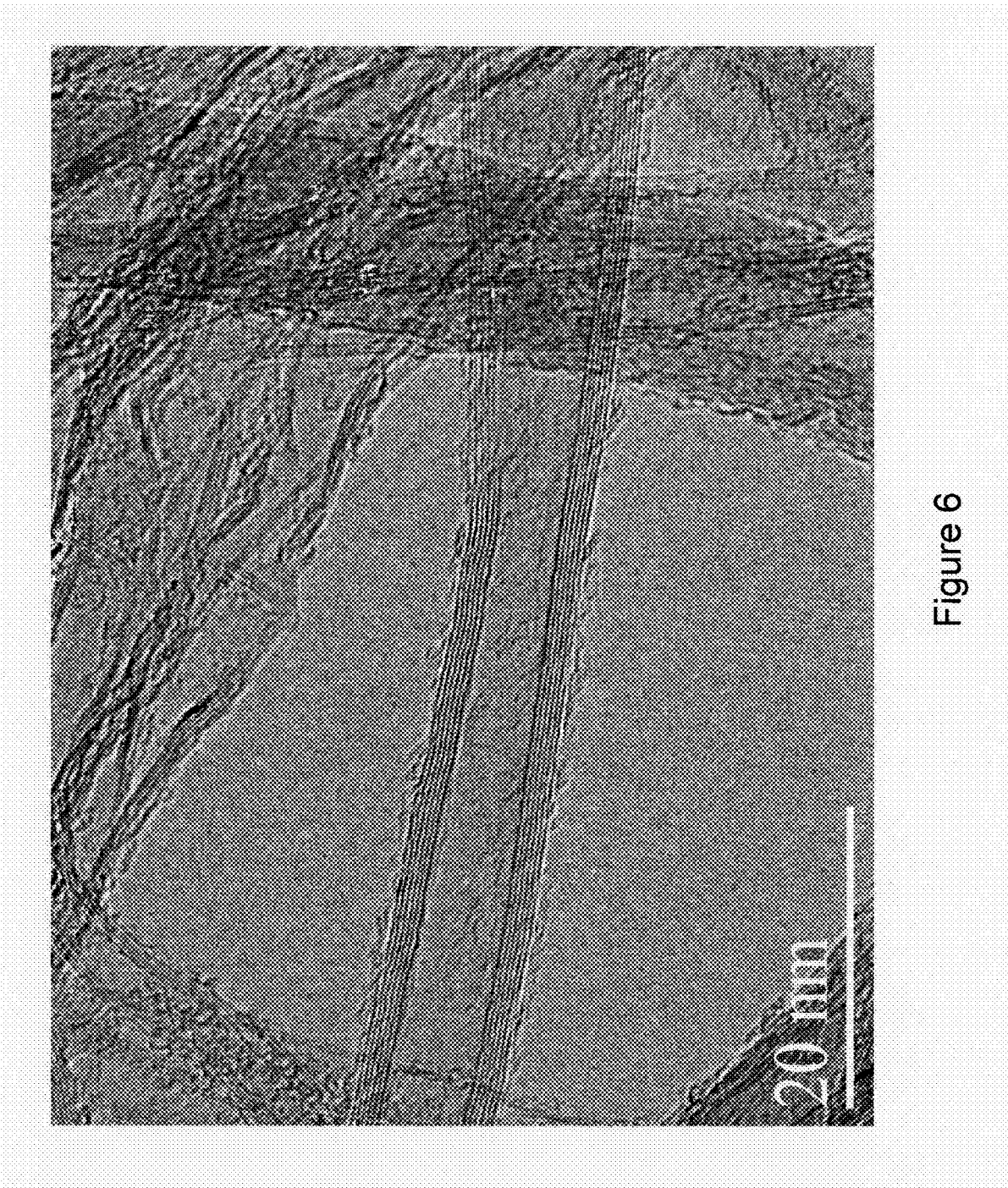
FIG. 6 shows a transmission electron microscope (TEM) image of a multi-walled CNT (MWNT) grown on AS4 carbon fiber via a continuous CVD process.
Figure 7:
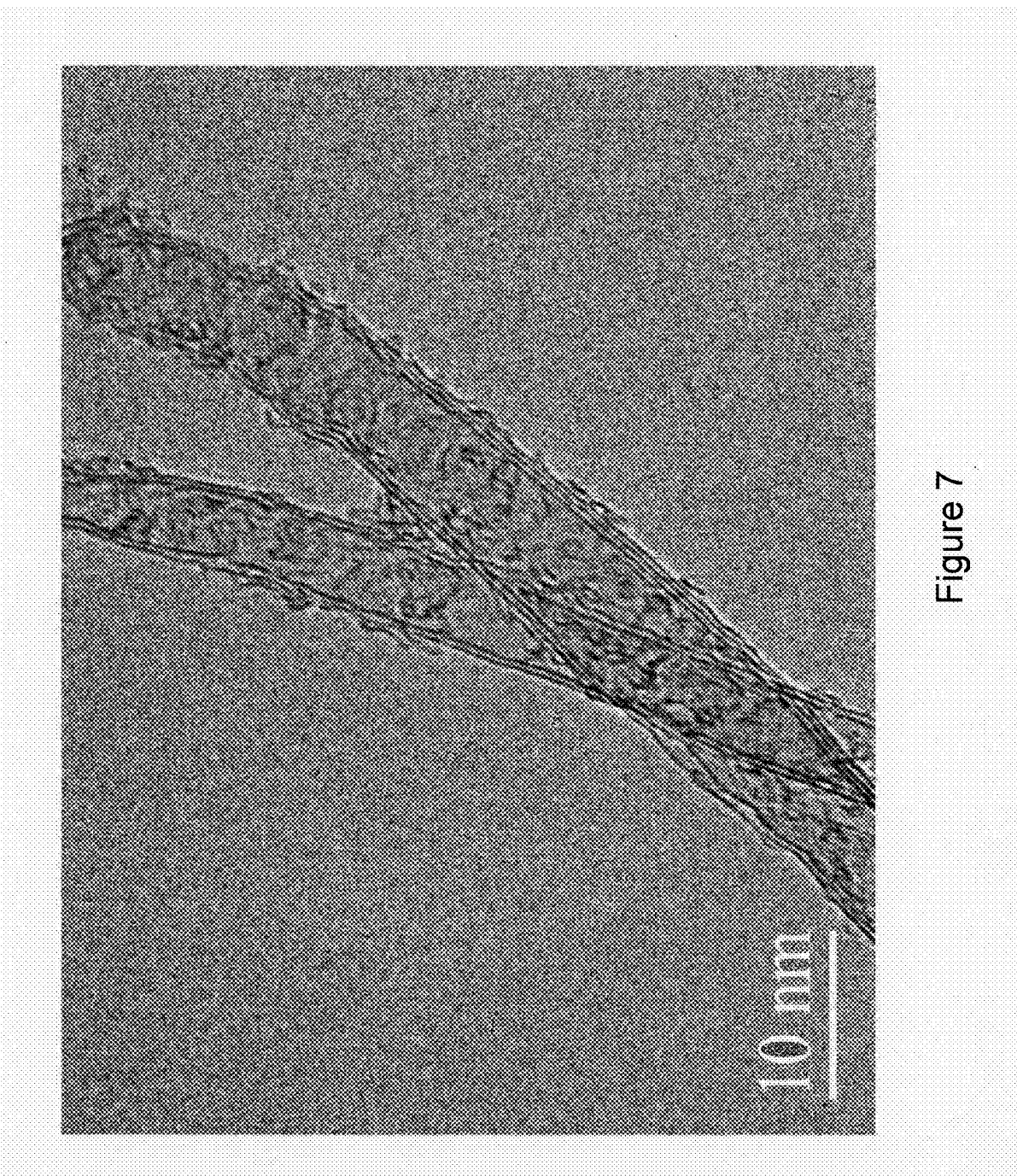
FIG. 7 shows a TEM image of a double-walled CNT (DWNT) grown on AS4 carbon fiber via a continuous CVD process.
Figure 8:
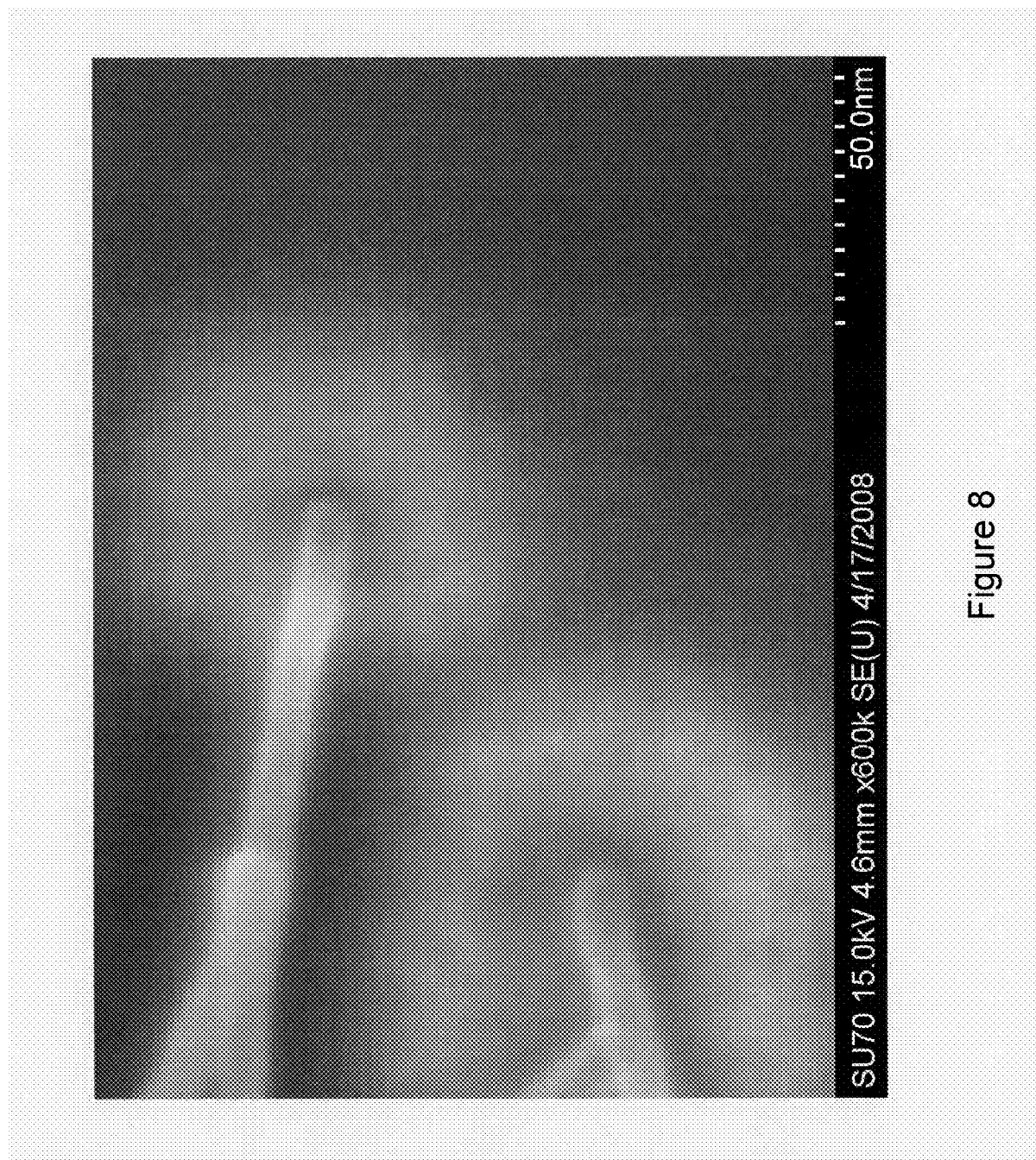
FIG. 8 shows a scanning electron microscope (SEM) image of CNTs growing from within the barrier coating where the CNT-forming nanoparticle catalyst was mechanically infused to the carbon fiber material surface.
Figure 9:
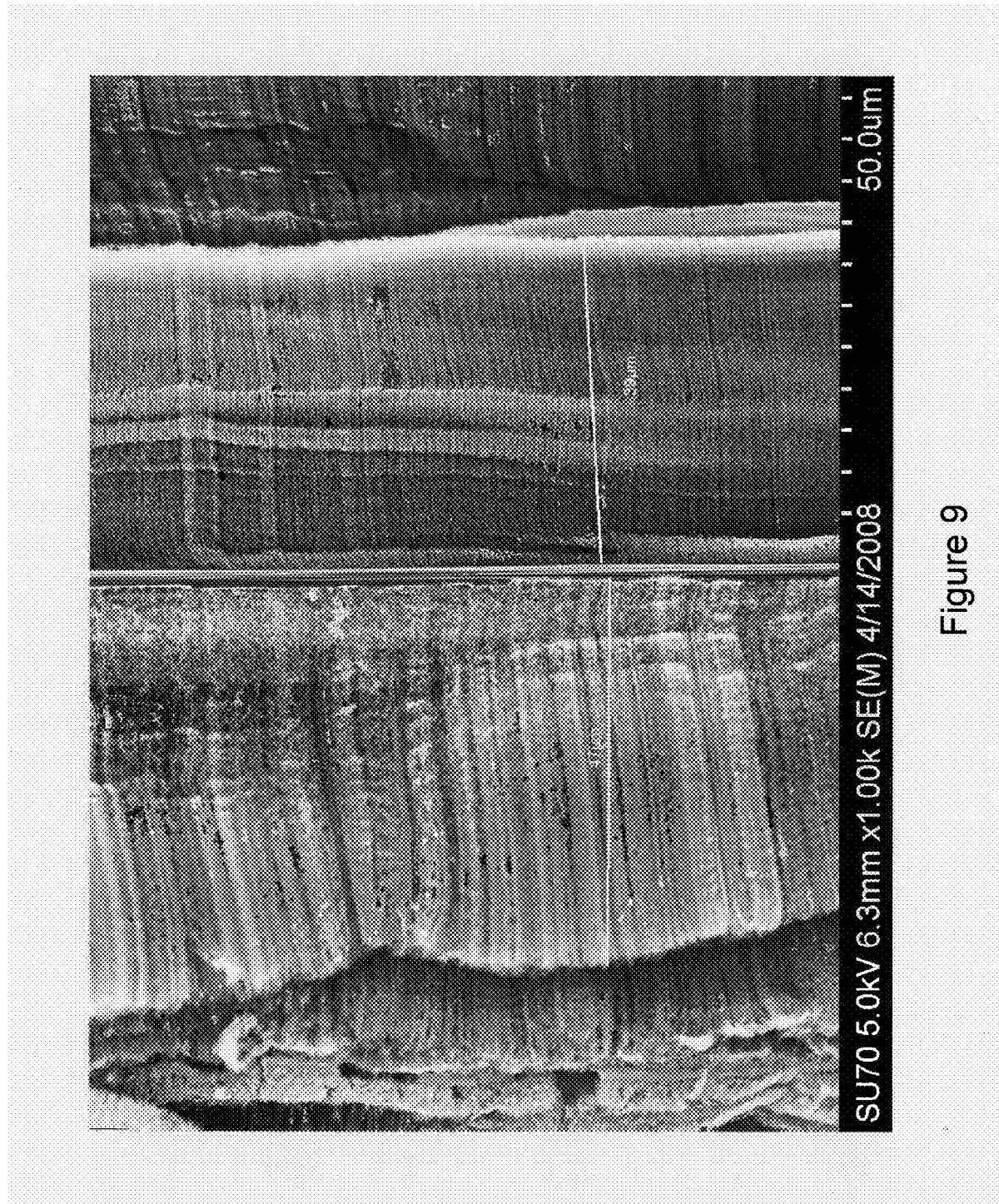
FIG. 9 shows a SEM image demonstrating the consistency in length distribution of CNTs grown on a carbon fiber material to within 20% of a targeted length of about 40 microns.
Figure 10:
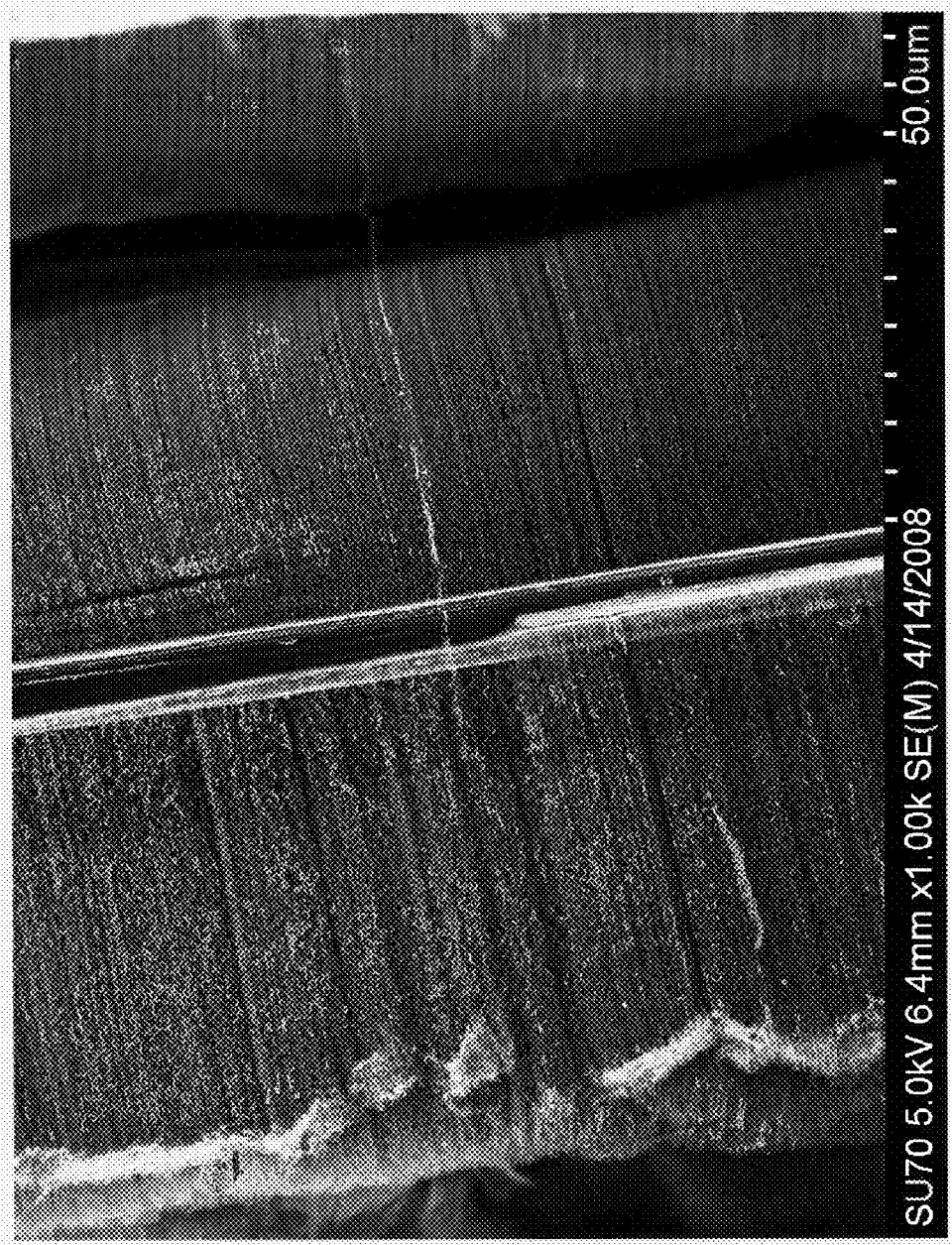
FIG. 10 shows an SEM image demonstrating the effect of a barrier coating on CNT growth. Dense, well aligned CNTs grew where barrier coating was applied and no CNTs grew where barrier coating was absent.

FIG. 5-10 shows TEM and SEM images of carbon fiber materials prepared by the processes described herein. The procedures for preparing these materials are further detailed below and in Examples I-III. FIGS. 5 and 6 show TEM images of multi-walled and double-walled carbon nanotubes, respectively, that were prepared on an AS4 carbon fiber in a continuous process. FIG. 7 shows a scanning electron microscope (SEM) image of CNTs growing from within the barrier coating after the CNT-forming nanoparticle catalyst was mechanically infused to a carbon fiber material surface. FIG. 8 shows a SEM image demonstrating the consistency in length distribution of CNTs grown on a carbon fiber material to within 20% of a targeted length of about 40 microns. FIG. 9 shows an SEM image demonstrating the effect of a barrier coating on CNT growth. Dense, well aligned CNTs grew where barrier coating was applied and no CNTs grew where barrier coating was absent. FIG. 10 shows a low magnification SEM of CNTs on carbon fiber demonstrating the uniformity of CNT density across the fibers within about 10%.

CNT-infused carbon fiber materials can be used in a myriad of applications. For example, chopped CNT-infused carbon fiber can be used in propellant applications. U.S. Pat. No. 4,072,546 describes the use of graphite fibers to augment propellant burning rate. The presence of CNTs infused on chopped carbon fiber can further enhance such burn rates. CNT-infused carbon fiber materials can also be used in flame retardant applications as well. For example, the CNTs can form a protective char layer that retards burning of a material coated with a layer of CNT infused carbon fiber material.

CNT-infused conductive carbon fibers can be used in the manufacture of electrodes for superconductors. In the production of superconducting fibers, it can be challenging to achieve adequate adhesion of the superconducting layer to a carrier fiber due, in part, to the different coefficients of thermal expansion of the fiber material and of the superconducting layer. Another difficulty in the art arises during the coating of the fibers by the CVD process. For example, reactive gases, such as hydrogen gas or ammonia, can attack the fiber surface and/or form undesired hydrocarbon compounds on the fiber surface and make good adhesion of the superconducting layer more difficult. CNT-infused carbon fiber materials with barrier coating can overcome these aforementioned challenges in the art.

In some embodiments the present invention provides a continuous process for CNT infusion that includes (a) disposing a carbon nanotube-forming catalyst on a surface of a carbon fiber material of spoolable dimensions; and (b) synthesizing carbon nanotubes directly on the carbon fiber material, thereby forming a carbon nanotube-infused carbon fiber material. For a 9 foot long system, the linespeed of the process can range from between about 1.5 ft/min to about 108 ft/min. The linespeeds achieved by the process described herein allow the formation of commercially relevant quantities of CNT-infused carbon fiber materials with short production times. For example, at 36 ft/min linespeed, the quantities of CNT-infused carbon fibers (over 5% infused CNTs on fiber by weight) can exceed over 100 pound or more of material produced per day in a system that is designed to simultaneously process 5 separate tows (20 lb/tow). Systems can be made to produce more tows at once or at faster speeds by repeating growth zones. Moreover, some steps in the fabrication of CNTs, as known in the art, have prohibitively slow rates preventing a continuous mode of operation. For example, in a typical process known in the art, a CNT-forming catalyst reduction step can take 1-12 hours to perform. CNT growth itself can also be time consuming, for example requiring tens of minutes for CNT growth, precluding the rapid linespeeds realized in the present invention. The process described herein overcomes such rate limiting steps.

The CNT-infused carbon fiber material-forming processes of the invention can avoid CNT entanglement that occurs when trying to apply suspensions of pre-formed carbon nanotubes to fiber materials. That is, because pre-formed CNTs are not fused to the carbon fiber material, the CNTs tend to bundle and entangle. The result is a poorly uniform distribution of CNTs that weakly adhere to the carbon fiber material. However, processes of the present invention can provide, if desired, a highly uniform entangled CNT mat on the surface of the carbon fiber material by reducing the growth density. The CNTs grown at low density are infused in the carbon fiber material first. In such embodiments, the fibers do not grow dense enough to induce vertical alignment, the result is entangled mats on the carbon fiber material surfaces. By contrast, manual application of pre-formed CNTs does not insure uniform distribution and density of a CNT mat on the carbon fiber material.

Figure 11:
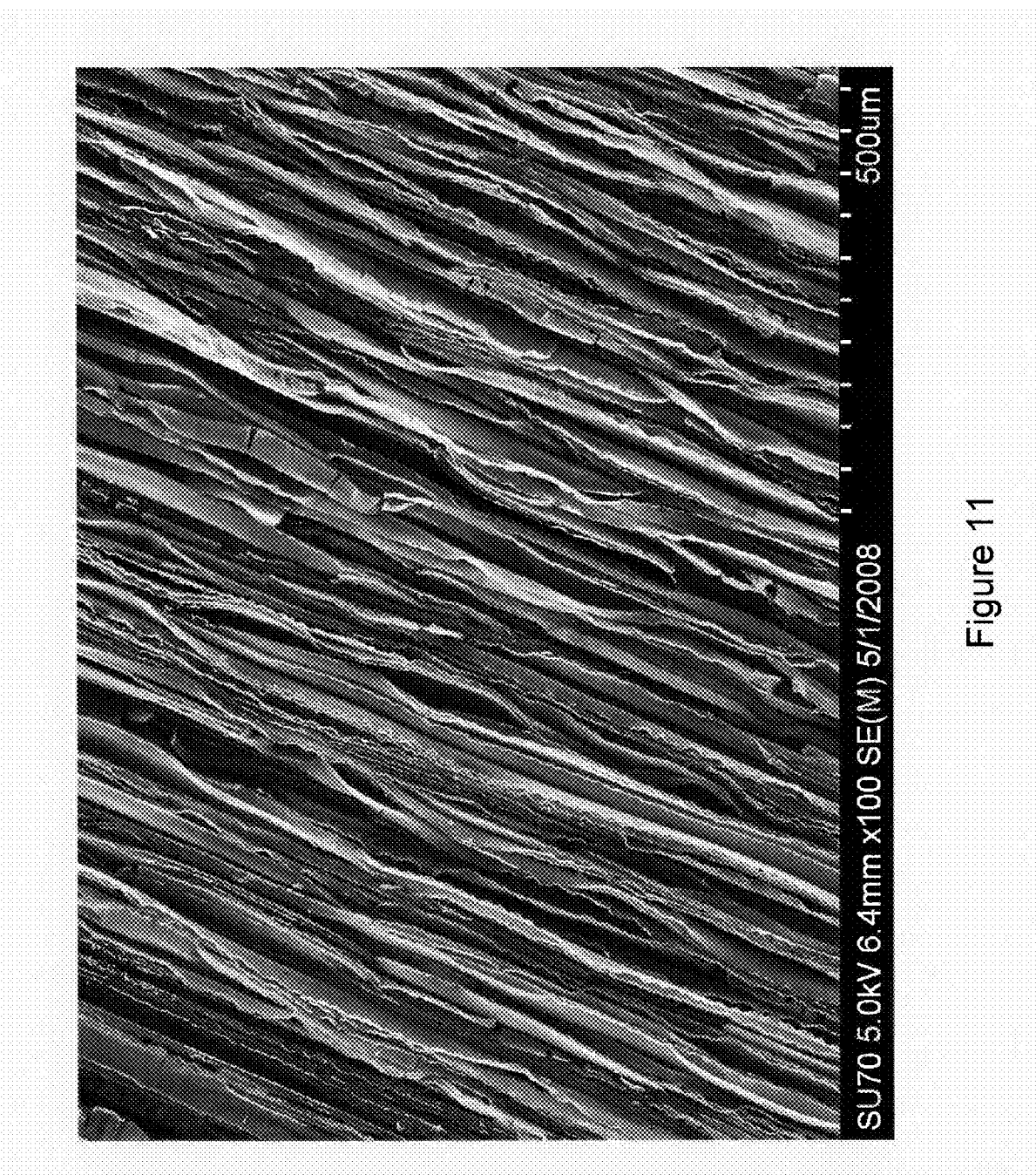
FIG. 11 shows a low magnification SEM of CNTs on carbon fiber demonstrating the uniformity of CNT density across the fibers within about 10%.

FIG. 11 depicts a flow diagram of process 700 for producing CNT-infused carbon fiber material in accordance with an illustrative embodiment of the present invention.

Process 700 includes at least the operations of:

701: Functionalizing the carbon fiber material.

702: Applying a barrier coating and a CNT-forming catalyst to the functionalized carbon fiber material.

704: Heating the carbon fiber material to a temperature that is sufficient for carbon nanotube synthesis.

706: Promoting CVD-mediated CNT growth on the catalyst-laden carbon fiber.

In step 701, the carbon fiber material is functionalized to promote surface wetting of the fibers and to improve adhesion of the barrier coating.

To infuse carbon nanotubes into a carbon fiber material, the carbon nanotubes are synthesized on the carbon fiber material which is conformally coated with a barrier coating. In one embodiment, this is accomplished by first conformally coating the carbon fiber material with a barrier coating and then disposing nanotube-forming catalyst on the barrier coating, as per operation 702. In some embodiments, the barrier coating can be partially cured prior to catalyst deposition. This can provide a surface that is receptive to receiving the catalyst and allowing it to embed in the barrier coating, including allowing surface contact between the CNT forming catalyst and the carbon fiber material. In such embodiments, the barrier coating can be fully cured after embedding the catalyst. In some embodiments, the barrier coating is conformally coated over the carbon fiber material simultaneously with deposition of the CNT-form catalyst. Once the CNT-forming catalyst and barrier coating are in place, the barrier coating can be fully cured.

In some embodiments, the barrier coating can be fully cured prior to catalyst deposition. In such embodiments, a fully cured barrier-coated carbon fiber material can be treated with a plasma to prepare the surface to accept the catalyst. For example, a plasma treated carbon fiber material having a cured barrier coating can provide a roughened surface in which the CNT-forming catalyst can be deposited. The plasma process for "roughing" the surface of the barrier thus facilitates catalyst deposition. The roughness is typically on the scale of nanometers. In the plasma treatment process craters or depressions are formed that are nanometers deep and nanometers in diameter. Such surface modification can be achieved using a plasma of any one or more of a variety of different gases, including, without limitation, argon, helium, oxygen, nitrogen, and hydrogen. In some embodiments, plasma roughing can also be performed directly in the carbon fiber material itself. This can facilitate adhesion of the barrier coating to the carbon fiber material.

As described further below and in conjunction with FIG. 11, the catalyst is prepared as a liquid solution that contains CNT-forming catalyst that comprise transition metal nanoparticles. The diameters of the synthesized nanotubes are related to the size of the metal particles as described above. In some embodiments, commercial dispersions of CNT-forming transition metal nanoparticle catalyst are available and are used without dilution, in other embodiments commercial dispersions of catalyst can be diluted. Whether to dilute such solutions can depend on the desired density and length of CNT to be grown as described above.

With reference to the illustrative embodiment of FIG. 11, carbon nanotube synthesis is shown based on a chemical vapor deposition (CVD) process and occurs at elevated temperatures. The specific temperature is a function of catalyst choice, but will typically be in a range of about 500 to 1000° C. Accordingly, operation 704 involves heating the barrier-coated carbon fiber material to a temperature in the aforementioned range to support carbon nanotube synthesis.

In operation 706, CVD-promoted nanotube growth on the catalyst-laden carbon fiber material is then performed. The CVD process can be promoted by, for example, a carbon-containing feedstock gas such as acetylene, ethylene, and/or ethanol. The CNT synthesis processes generally use an inert gas (nitrogen, argon, helium) as a primary carrier gas. The carbon feedstock is provided in a range from between about 0% to about 15% of the total mixture. A substantially inert environment for CVD growth is prepared by removal of moisture and oxygen from the growth chamber.

In the CNT synthesis process, CNTs grow at the sites of a CNT-forming transition metal nanoparticle catalyst. The presence of the strong plasma-creating electric field can be optionally employed to affect nanotube growth. That is, the growth tends to follow the direction of the electric field. By properly adjusting the geometry of the plasma spray and electric field, vertically-aligned CNTs (i.e., perpendicular to the carbon fiber material) can be synthesized. Under certain conditions, even in the absence of a plasma, closely-spaced nanotubes will maintain a vertical growth direction resulting in a dense array of CNTs resembling a carpet or forest. The presence of the barrier coating can also influence the directionality of CNT growth.

The operation of disposing a catalyst on the carbon fiber material can be accomplished by spraying or dip coating a solution or by gas phase deposition via, for example, a plasma process. The choice of techniques can be coordinated with the mode with which the barrier coating is applied. Thus, in some embodiments, after forming a solution of a catalyst in a solvent, catalyst can be applied by spraying or dip coating the barrier coated carbon fiber material with the solution, or combinations of spraying and dip coating. Either technique, used alone or in combination, can be employed once, twice, thrice, four times, up to any number of times to provide a carbon fiber material that is sufficiently uniformly coated with CNT-forming catalyst. When dip coating is employed, for example, a carbon fiber material can be placed in a first dip bath for a first residence time in the first dip bath. When employing a second dip bath, the carbon fiber material can be placed in the second dip bath for a second residence time. For example, carbon fiber materials can be subjected to a solution of CNT-forming catalyst for between about 3 seconds to about 90 seconds depending on the dip configuration and linespeed. Employing spraying or dip coating processes, a carbon fiber material with a surface density of catalyst of less than about 5% surface coverage to as high as about 80% coverage, in which the CNT-forming catalyst nanoparticles are nearly monolayer. In some embodiments, the process of coating the CNT-forming catalyst on the carbon fiber material should produce no more than a monolayer. For example, CNT growth on a stack of CNT-forming catalyst can erode the degree of infusion of the CNT to the carbon fiber material. In other embodiments, the transition metal catalyst can be deposited on the carbon fiber material using evaporation techniques, electrolytic deposition techniques, and other processes known to those skilled in the art, such as addition of the transition metal catalyst to a plasma feedstock gas as a metal organic, metal salt or other composition promoting gas phase transport.

Because processes of the invention are designed to be continuous, a spoolable carbon fiber material can be dip-coated in a series of baths where dip coating baths are spatially separated. In a continuous process in which nascent carbon fibers are being generated de novo, dip bath or spraying of CNT-forming catalyst can be the first step after applying and curing or partially curing a barrier coating to the carbon fiber material. Application of the barrier coating and a CNT-forming catalyst can be performed in lieu of application of a sizing, for newly formed carbon fiber materials. In other embodiments, the CNT-forming catalyst can be applied to newly formed carbon fibers in the presence of other sizing agents after barrier coating. Such simultaneous application of CNT-forming catalyst and other sizing agents can still provide the CNT-forming catalyst in surface contact with the barrier coating of the carbon fiber material to insure CNT infusion.

The catalyst solution employed can be a transition metal nanoparticle which can be any d-block transition metal as described above. In addition, the nanoparticles can include alloys and non-alloy mixtures of d-block metals in elemental form or in salt form, and mixtures thereof. Such salt forms include, without limitation, oxides, carbides, and nitrides. Non-limiting exemplary transition metal NPs include Ni, Fe, Co, Mo, Cu, Pt, Au, and Ag and salts thereof and mixtures thereof. In some embodiments, such CNT-forming catalysts are disposed on the carbon fiber by applying or infusing a CNT-forming catalyst directly to the carbon fiber material simultaneously with barrier coating deposition. Many of these transition metal catalysts are readily commercially available from a variety of suppliers, including, for example, Ferrotec Corporation (Bedford, N.H.).

Catalyst solutions used for applying the CNT-forming catalyst to the carbon fiber material can be in any common solvent that allows the CNT-forming catalyst to be uniformly dispersed throughout. Such solvents can include, without limitation, water, acetone, hexane, isopropyl alcohol, toluene, ethanol, methanol, tetrahydrofuran (THF), cyclohexane or any other solvent with controlled polarity to create an appropriate dispersion of the CNT-forming catalyst nanoparticles. Concentrations of CNT-forming catalyst can be in a range from about 1:1 to 1:10000 catalyst to solvent. Such concentrations can be used when the barrier coating and CNT-forming catalyst is applied simultaneously as well.

In some embodiments heating of the carbon fiber material can be at a temperature that is between about 500° C. and 1000° C. to synthesize carbon nanotubes after deposition of the CNT-forming catalyst. Heating at these temperatures can be performed prior to or substantially simultaneously with introduction of a carbon feedstock for CNT growth.

In some embodiments, the present invention provides a process that includes removing sizing agents from a carbon fiber material, applying a barrier coating conformally over the carbon fiber material, applying a CNT-forming catalyst to the carbon fiber material, heating the carbon fiber material to at least 500° C., and synthesizing carbon nanotubes on the carbon fiber material. In some embodiments, operations of the CNT-infusion process include removing sizing from a carbon fiber material, applying a barrier coating to the carbon fiber material, applying a CNT-forming catalyst to the carbon fiber, heating the fiber to CNT-synthesis temperature and CVD-promoted CNT growth the catalyst-laden carbon fiber material. Thus, where commercial carbon fiber materials are employed, processes for constructing CNT-infused carbon fibers can include a discrete step of removing sizing from the carbon fiber material before disposing barrier coating and the catalyst on the carbon fiber material.

The step of synthesizing carbon nanotubes can include numerous techniques for forming carbon nanotubes, including those disclosed in co-pending U.S. Patent Application No. US 2004/0245088 which is incorporated herein by reference. The CNTs grown on fibers of the present invention can be accomplished by techniques known in the art including, without limitation, micro-cavity, thermal or plasma-enhanced CVD techniques, laser ablation, arc discharge, and high pressure carbon monoxide (HiPCO). During CVD, in particular, a barrier coated carbon fiber material with CNT-forming catalyst disposed thereon, can be used directly. In some embodiments, any conventional sizing agents can be removed prior CNT synthesis. In some embodiments, acetylene gas is ionized to create a jet of cold carbon plasma for CNT synthesis. The plasma is directed toward the catalyst-bearing carbon fiber material. Thus, in some embodiments synthesizing CNTs on a carbon fiber material includes (a) forming a carbon plasma; and (b) directing the carbon plasma onto the catalyst disposed on the carbon fiber material. The diameters of the CNTs that are grown are dictated by the size of the CNT-forming catalyst as described above. In some embodiments, the sized fiber substrate is heated to between about 550 to about 800° C. to facilitate CNT synthesis. To initiate the growth of CNTs, two gases are bled into the reactor: a process gas such as argon, helium, or nitrogen, and a carbon-containing gas, such as acetylene, ethylene, ethanol or methane. CNTs grow at the sites of the CNT-forming catalyst.

In some embodiments, the CVD growth is plasma-enhanced. A plasma can be generated by providing an electric field during the growth process. CNTs grown under these conditions can follow the direction of the electric field. Thus, by adjusting the geometry of the reactor vertically aligned carbon nanotubes can be grown radially about a cylindrical fiber. In some embodiments, a plasma is not required for radial growth about the fiber. For carbon fiber materials that have distinct sides such as tapes, mats, fabrics, plies, and the like, catalyst can be disposed on one or both sides and correspondingly, CNTs can be grown on one or both sides as well.

As described above, CNT-synthesis is performed at a rate sufficient to provide a continuous process for functionalizing spoolable carbon fiber materials. Numerous apparatus configurations facilitate such continuous synthesis as exemplified below.

In some embodiments, CNT-infused carbon fiber materials can be constructed in an "all plasma" process. An all plasma process can being with roughing the carbon fiber material with a plasma as described above to improve fiber surface wetting characteristics and provide a more conformal barrier coating, as well as improve coating adhesion via mechanical interlocking and chemical adhesion through the use of functionalization of the carbon fiber material by using specific reactive gas species, such as oxygen, nitrogen, hydrogen in argon or helium based plasmas.

Barrier coated carbon fiber materials pass through numerous further plasma-mediated steps to form the final CNT-infused product. In some embodiments, the all plasma process can include a second surface modification after the barrier coating is cured. This is a plasma process for "roughing" the surface of the barrier coating on the carbon fiber material to facilitate catalyst deposition. As described above, surface modification can be achieved using a plasma of any one or more of a variety of different gases, including, without limitation, argon, helium, oxygen, ammonia, hydrogen, and nitrogen.

After surface modification, the barrier coated carbon fiber material proceeds to catalyst application. This is a plasma process for depositing the CNT-forming catalyst on the fibers. The CNT-forming catalyst is typically a transition metal as described above. The transition metal catalyst can be added to a plasma feedstock gas as a precursor in the form of a ferrofluid, a metal organic, metal salt or other composition for promoting gas phase transport. The catalyst can be applied at room temperature in the ambient environment with neither vacuum nor an inert atmosphere being required. In some embodiments, the carbon fiber material is cooled prior to catalyst application.

Continuing the all-plasma process, carbon nanotube synthesis occurs in a CNT-growth reactor. This can be achieved through the use of plasma-enhanced chemical vapor deposition, wherein carbon plasma is sprayed onto the catalyst-laden fibers. Since carbon nanotube growth occurs at elevated temperatures (typically in a range of about 500 to 1000° C. depending on the catalyst), the catalyst-laden fibers can be heated prior to exposing to the carbon plasma. For the infusion process, the carbon fiber material can be optionally heated until it softens. After heating, the carbon fiber material is ready to receive the carbon plasma. The carbon plasma is generated, for example, by passing a carbon containing gas such as acetylene, ethylene, ethanol, and the like, through an electric field that is capable of ionizing the gas. This cold carbon plasma is directed, via spray nozzles, to the carbon fiber material. The carbon fiber material can be in close proximity to the spray nozzles, such as within about 1 centimeter of the spray nozzles, to receive the plasma. In some embodiments, heaters are disposed above the carbon fiber material at the plasma sprayers to maintain the elevated temperature of the carbon fiber material.

Another configuration for continuous carbon nanotube synthesis involves a special rectangular reactor for the synthesis and growth of carbon nanotubes directly on carbon fiber materials. The reactor can be designed for use in a continuous in-line process for producing carbon-nanotube bearing fibers. In some embodiments, CNTs are grown via a chemical vapor deposition ("CVD") process at atmospheric pressure and at elevated temperature in the range of about 550° C. to about 800° C. in a multi-zone reactor. The fact that the synthesis occurs at atmospheric pressure is one factor that facilitates the incorporation of the reactor into a continuous processing line for CNT-on-fiber synthesis. Another advantage consistent with in-line continuous processing using such a zone reactor is that CNT growth occurs in a seconds, as opposed to minutes (or longer) as in other procedures and apparatus configurations typical in the art.

CNT synthesis reactors in accordance with the various embodiments include the following features:

Rectangular Configured Synthesis Reactors:

The cross section of a typical CNT synthesis reactor known in the art is circular. There are a number of reasons for this including, for example, historical reasons (cylindrical reactors are often used in laboratories) and convenience (flow dynamics are easy to model in cylindrical reactors, heater systems readily accept circular tubes (quartz, etc.), and ease of manufacturing. Departing from the cylindrical convention, the present invention provides a CNT synthesis reactor having a rectangular cross section. The reasons for the departure are as follows: 1. Since many carbon fiber materials that can be processed by the reactor are relatively planar such as flat tape or sheet-like in form, a circular cross section is an inefficient use of the reactor volume. This inefficiency results in several drawbacks for cylindrical CNT synthesis reactors including, for example, a) maintaining a sufficient system purge; increased reactor volume requires increased gas flow rates to maintain the same level of gas purge. This results in a system that is inefficient for high volume production of CNTs in an open environment; b) increased carbon feedstock gas flow; the relative increase in inert gas flow, as per a) above, requires increased carbon feedstock gas flows. Consider that the volume of a 12K carbon fiber tow is 2000 times less than the total volume of a synthesis reactor having a rectangular cross section. In an equivalent growth cylindrical reactor (i.e., a cylindrical reactor that has a width that accommodates the same planarized carbon fiber material as the rectangular cross-section reactor), the volume of the carbon fiber material is 17,500 times less than the volume of the chamber. Although gas deposition processes, such as CVD, are typically governed by pressure and temperature alone, volume has a significant impact on the efficiency of deposition. With a rectangular reactor there is a still excess volume. This excess volume facilitates unwanted reactions; yet a cylindrical reactor has about eight times that volume. Due to this greater opportunity for competing reactions to occur, the desired reactions effectively occur more slowly in a cylindrical reactor chamber. Such a slow down in CNT growth, is problematic for the development of a continuous process. One benefit of a rectangular reactor configuration is that the reactor volume can be decreased by using a small height for the rectangular chamber to make this volume ratio better and reactions more efficient. In some embodiments of the present invention, the total volume of a rectangular synthesis reactor is no more than about 3000 times greater than the total volume of a carbon fiber material being passed through the synthesis reactor. In some further embodiments, the total volume of the rectangular synthesis reactor is no more than about 4000 times greater than the total volume of the carbon fiber material being passed through the synthesis reactor. In some still further embodiments, the total volume of the rectangular synthesis reactor is less than about 10,000 times greater than the total volume of the carbon fiber material being passed through the synthesis reactor. Additionally, it is notable that when using a cylindrical reactor, more carbon feedstock gas is required to provide the same flow percent as compared to reactors having a rectangular cross section. It should be appreciated that in some other embodiments, the synthesis reactor has a cross section that is described by polygonal forms that are not rectangular, but are relatively similar thereto and provide a similar reduction in reactor volume relative to a reactor having a circular cross section; c) problematic temperature distribution; when a relatively small-diameter reactor is used, the temperature gradient from the center of the chamber to the walls thereof is minimal. But with increased size, such as would be used for commercial-scale production, the temperature gradient increases. Such temperature gradients result in product quality variations across a carbon fiber material substrate (i.e., product quality varies as a function of radial position). This problem is substantially avoided when using a reactor having a rectangular cross section. In particular, when a planar substrate is used, reactor height can be maintained constant as the size of the substrate scales upward. Temperature gradients between the top and bottom of the reactor are essentially negligible and, as a consequence, thermal issues and the product-quality variations that result are avoided. 2. Gas introduction: Because tubular furnaces are normally employed in the art, typical CNT synthesis reactors introduce gas at one end and draw it through the reactor to the other end. In some embodiments disclosed herein, gas can be introduced at the center of the reactor or within a target growth zone, symmetrically, either through the sides or through the top and bottom plates of the reactor. This improves the overall CNT growth rate because the incoming feedstock gas is continuously replenishing at the hottest portion of the system, which is where CNT growth is most active. This constant gas replenishment is an important aspect to the increased growth rate exhibited by the rectangular CNT reactors.

Zoning.

Chambers that provide a relatively cool purge zone depend from both ends of the rectangular synthesis reactor. Applicants have determined that if hot gas were to mix with the external environment (i.e., outside of the reactor), there would be an increase in degradation of the carbon fiber material. The cool purge zones provide a buffer between the internal system and external environments. Typical CNT synthesis reactor configurations known in the art typically require that the substrate is carefully (and slowly) cooled. The cool purge zone at the exit of the present rectangular CNT growth reactor achieves the cooling in a short period of time, as required for the continuous in-line processing.

Non-Contact, Hot-Walled, Metallic Reactor.

In some embodiments, a hot-walled reactor is made of metal is employed, in particular stainless steel. This may appear counterintuitive because metal, and stainless steel in particular, is more susceptible to carbon deposition (i.e., soot and by-product formation). Thus, most CNT reactor configurations use quartz reactors because there is less carbon deposited, quartz is easier to clean, and quartz facilitates sample observation. However, Applicants have observed that the increased soot and carbon deposition on stainless steel results in more consistent, faster, more efficient, and more stable CNT growth. Without being bound by theory it has been indicated that, in conjunction with atmospheric operation, the CVD process occurring in the reactor is diffusion limited. That is, the catalyst is "overfed;" too much carbon is available in the reactor system due to its relatively higher partial pressure (than if the reactor was operating under partial vacuum). As a consequence, in an open system—especially a clean one—too much carbon can adhere to catalyst particles, compromising their ability to synthesize CNTs. In some embodiments, the rectangular reactor is intentionally run when the reactor is "dirty," that is with soot deposited on the metallic reactor walls. Once carbon deposits to a monolayer on the walls of the reactor, carbon will readily deposit over itself. Since some of the available carbon is "withdrawn" due to this mechanism, the remaining carbon feedstock, in the form of radicals, react with the catalyst at a rate that does not poison the catalyst. Existing systems run "cleanly" which, if they were open for continuous processing, would produced a much lower yield of CNTs at reduced growth rates.

Although it is generally beneficial to perform CNT synthesis "dirty" as described above, certain portions of the apparatus, such as gas manifolds and inlets, can nonetheless negatively impact the CNT growth process when soot created blockages. In order to combat this problem, such areas of the CNT growth reaction chamber can be protected with soot inhibiting coatings such as silica, alumina, or MgO. In practice, these portions of the apparatus can be dip-coated in these soot inhibiting coatings. Metals such as INVAR® can be used with these coatings as INVAR has a similar CTE (coefficient of thermal expansion) ensuring proper adhesion of the coating at higher temperatures, preventing the soot from significantly building up in critical zones.

Combined Catalyst Reduction and CNT Synthesis.

In the CNT synthesis reactor disclosed herein, both catalyst reduction and CNT growth occur within the reactor. This is significant because the reduction step cannot be accomplished timely enough for use in a continuous process if performed as a discrete operation. In a typical process known in the art, a reduction step typically takes 1-12 hours to perform. Both operations occur in a reactor in accordance with the present invention due, at least in part, to the fact that carbon feedstock gas is introduced at the center of the reactor, not the end as would be typical in the art using cylindrical reactors. The reduction process occurs as the fibers enter the heated zone; by this point, the gas has had time to react with the walls and cool off prior to reacting with the catalyst and causing the oxidation reduction (via hydrogen radical interactions). It is this transition region where the reduction occurs. At the hottest isothermal zone in the system, the CNT growth occurs, with the greatest growth rate occurring proximal to the gas inlets near the center of the reactor.

In some embodiments, when loosely affiliated carbon fiber materials, such as carbon tow are employed, the continuous process can include steps that spreads out the strands and/or filaments of the tow. Thus, as a tow is unspooled it can be spread using a vacuum-based fiber spreading system, for example. When employing sized carbon fibers, which can be relatively stiff, additional heating can be employed in order to "soften" the tow to facilitate fiber spreading. The spread fibers which comprise individual filaments can be spread apart sufficiently to expose an entire surface area of the filaments, thus allowing the tow to more efficiently react in subsequent process steps. Such spreading can approach between about 4 inches to about 6 inches across for a 3 k tow. The spread carbon tow can pass through a surface treatment step that is composed of a plasma system as described above. After a barrier coating is applied and roughened, spread fibers then can pass through a CNT-forming catalyst dip bath. The result is fibers of the carbon tow that have catalyst particles distributed radially on their surface. The catalyzed-laden fibers of the tow then enter an appropriate CNT growth chamber, such as the rectangular chamber described above, where a flow through atmospheric pressure CVD or PE-CVD process is used to synthesize the CNTs at rates as high as several microns per second. The fibers of the tow, now with radially aligned CNTs, exit the CNT growth reactor.

In some embodiments, CNT-infused carbon fiber materials can pass through yet another treatment process that, in some embodiments is a plasma process used to functionalize the CNTs. Additional functionalization of CNTs can be used to promote their adhesion to particular resins. Thus, in some embodiments, the present invention provides CNT-infused carbon fiber materials having functionalized CNTs.

As part of the continuous processing of spoolable carbon fiber materials, the a CNT-infused carbon fiber material can further pass through a sizing dip bath to apply any additional sizing agents which can be beneficial in a final product. Finally if wet winding is desired, the CNT-infused carbon fiber materials can be passed through a resin bath and wound on a mandrel or spool. The resulting carbon fiber material/resin combination locks the CNTs on the carbon fiber material allowing for easier handling and composite fabrication. In some embodiments, CNT infusion is used to provide improved filament winding. Thus, CNTs formed on carbon fibers such as carbon tow, are passed through a resin bath to produce resin-impregnated, CNT-infused carbon tow. After resin impregnation, the carbon tow can be positioned on the surface of a rotating mandrel by a delivery head. The tow can then be wound onto the mandrel in a precise geometric pattern in known fashion.

The winding process described above provides pipes, tubes, or other forms as are characteristically produced via a male mold. But the forms made from the winding process disclosed herein differ from those produced via conventional filament winding processes. Specifically, in the process disclosed herein, the forms are made from composite materials that include CNT-infused tow. Such forms will therefore benefit from enhanced strength and the like, as provided by the CNT-infused tow.

In some embodiments, a continuous process for infusion of CNTs on spoolable carbon fiber materials can achieve a linespeed between about 0.5 ft/min to about 36 ft/min. In this embodiment where the CNT growth chamber is 3 feet long and operating at a 750° C. growth temperature, the process can be run with a linespeed of about 6 ft/min to about 36 ft/min to produce, for example, CNTs having a length between about 1 micron to about 10 microns. The process can also be run with a linespeed of about 1 ft/min to about 6 ft/min to produce, for example, CNTs having a length between about 10 microns to about 100 microns. The process can be run with a linespeed of about 0.5 ft/min to about 1 ft/min to produce, for example, CNTs having a length between about 100 microns to about 200 microns. The CNT length is not tied only to linespeed and growth temperature, however, the flow rate of both the carbon feedstock and the inert carrier gases can also influence CNT length. For example, a flow rate consisting of less than 1% carbon feedstock in inert gas at high linespeeds (6 ft/min to 36 ft/min) will result in CNTs having a length between 1 micron to about 5 microns. A flow rate consisting of more than 1% carbon feedstock in inert gas at high linespeeds (6 ft/min to 36 ft/min) will result in CNTs having length between 5 microns to about 10 microns.

In some embodiments, more than one carbon material can be run simultaneously through the process. For example, multiple tapes tows, filaments, strand and the like can be run through the process in parallel. Thus, any number of prefabricated spools of carbon fiber material can be run in parallel through the process and re-spooled at the end of the process. The number of spooled carbon fiber materials that can be run in parallel can include one, two, three, four, five, six, up to any number that can be accommodated by the width of the CNT-growth reaction chamber. Moreover, when multiple carbon fiber materials are run through the process, the number of collection spools can be less than the number of spools at the start of the process. In such embodiments, carbon strands, tows, or the like can be sent through a further process of combining such carbon fiber materials into higher ordered carbon fiber materials such as woven fabrics or the like. The continuous process can also incorporate a post processing chopper that facilitates the formation CNT-infused chopped fiber mats, for example.

In some embodiments, processes of the invention allow for synthesizing a first amount of a first type of carbon nanotube on the carbon fiber material, in which the first type of carbon nanotube is selected to alter at least one first property of the carbon fiber material. Subsequently, process of the invention allow for synthesizing a second amount of a second type of carbon nanotube on the carbon fiber material, in which the second type of carbon nanotube is selected to alter at least one second property of the carbon fiber material.

In some embodiments, the first amount and second amount of CNTs are different. This can be accompanied by a change in the CNT type or not. Thus, varying the density of CNTs can be used to alter the properties of the original carbon fiber material, even if the CNT type remains unchanged. CNT type can include CNT length and the number of walls, for example. In some embodiments the first amount and the second amount are the same. If different properties are desirable in this case along the two different stretches of the spoolable material, then the CNT type can be changed, such as the CNT length. For example, longer CNTs can be useful in electrical/thermal applications, while shorter CNTs can be useful in mechanical strengthening applications.

In light of the aforementioned discussion regarding altering the properties of the carbon fiber materials, the first type of carbon nanotube and the second type of carbon nanotube can be the same, in some embodiments, while the first type of carbon nanotube and the second type of carbon nanotube can be different, in other embodiments. Likewise, the first property and the second property can be the same, in some embodiments. For example, the EMI shielding property can be the property of interest addressed by the first amount and type of CNTs and the 2nd amount and type of CNTs, but the degree of change in this property can be different, as reflected by differing amounts, and/or types of CNTs employed. Finally, in some embodiments, the first property and the second property can be different. Again this may reflect a change in CNT type. For example the first property can be mechanical strength with shorter CNTs, while the second property can be electrical/thermal properties with longer CNTs. One skilled in the art will recognize the ability to tailor the properties of the carbon fiber material through the use of different CNT densities, CNT lengths, and the number of walls in the CNTs, such as single-walled, double-walled, and multi-walled, for example.

In some embodiments, processes of the present invention provides synthesizing a first amount of carbon nanotubes on a carbon fiber material, such that this first amount allows the carbon nanotube-infused carbon fiber material to exhibit a second group of properties that differ from a first group of properties exhibited by the carbon fiber material itself. That is, selecting an amount that can alter one or more properties of the carbon fiber material, such as tensile strength. The first group of properties and second group of properties can include at least one of the same properties, thus representing enhancing an already existing property of the carbon fiber material. In some embodiments, CNT infusion can impart a second group of properties to the carbon nanotube-infused carbon fiber material that is not included among the first group of properties exhibited by the carbon fiber material itself.

In some embodiments, a first amount of carbon nanotubes is selected such that the value of at least one property selected from the group consisting of tensile strength, Young's Modulus, shear strength, shear modulus, toughness, compression strength, compression modulus, density, EM wave absorptivity/reflectivity, acoustic transmittance, electrical conductivity, and thermal conductivity of the carbon nanotube-infused carbon fiber material differs from the value of the same property of the carbon fiber material itself.

Tensile strength can include three different measurements: 1) Yield strength which evaluates the stress at which material strain changes from elastic deformation to plastic deformation, causing the material to deform permanently; 2) Ultimate strength which evaluates the maximum stress a material can withstand when subjected to tension, compression or shearing; and 3) Breaking strength which evaluates the stress coordinate on a stress-strain curve at the point of rupture. Composite shear strength evaluates the stress at which a material fails when a load is applied perpendicular to the fiber direction. Compression strength evaluates the stress at which a material fails when a compressive load is applied.

Multiwalled carbon nanotubes, in particular, have the highest tensile strength of any material yet measured, with a tensile strength of 63 GPa having been achieved. Moreover, theoretical calculations have indicated possible tensile strengths of CNTs of about 300 GPa. Thus, CNT-infused carbon fiber materials are expected to have substantially higher ultimate strength compared to the parent carbon fiber material. As described above, the increase in tensile strength will depend on the exact nature of the CNTs used as well as the density and distribution on the carbon fiber material. CNT-infused carbon fiber materials can exhibit a tow to three times increase in tensile properties, for example. Exemplary CNT-infused carbon fiber materials can have as high as three times the shear strength as the parent unfunctionalized carbon fiber material and as high as 2.5 times the compression strength.

Young's modulus is a measure of the stiffness of an isotropic elastic material. It is defined as the ratio of the uniaxial stress over the uniaxial strain in the range of stress in which Hooke's Law holds. This can be experimentally determined from the slope of a stress-strain curve created during tensile tests conducted on a sample of the material.

Electrical conductivity or specific conductance is a measure of a material's ability to conduct an electric current. CNTs with particular structural parameters such as the degree of twist, which relates to CNT chirality, can be highly conducting, thus exhibiting metallic properties. A recognized system of nomenclature (M. S. Dresselhaus, et al. Science of Fullerenes and Carbon Nanotubes, Academic Press, San Diego, Calif. pp. 756-760, (1996)) has been formalized and is recognized by those skilled in the art with respect to CNT chirality. Thus, for example, CNTs are distinguished from each other by a double index (n,m) where n and m are integers that describe the cut and wrapping of hexagonal graphite so that it makes a tube when it is wrapped onto the surface of a cylinder and the edges are sealed together. When the two indices are the same, m=n, the resultant tube is said to be of the "arm-chair" (or n,n) type, since when the tube is cut perpendicular to the CNT axis only the sides of the hexagons are exposed and their pattern around the periphery of the tube edge resembles the arm and seat of an arm chair repeated n times. Arm-chair CNTs, in particular SWNTs, are metallic, and have extremely high electrical and thermal conductivity. In addition, such SWNTs have extremely high tensile strength.

In addition to the degree of twist CNT diameter also effects electrical conductivity. As described above, CNT diameter can be controlled by use of controlled size CNT-forming catalyst nanoparticles. CNTs can also be formed as semiconducting materials. Conductivity in multi-walled CNTs (MWNTs) can be more complex. Interwall reactions within MWNTs can redistribute current over individual tubes non-uniformly. By contrast, there is no change in current across different parts of metallic single-walled nanotubes (SWNTs). Carbon nanotubes also have very high thermal conductivity, comparable to diamond crystal and in-plane graphite sheet.

The CNT-infused carbon fiber materials can benefit from the presence of CNTs not only in the properties described above, but can also provide lighter materials in the process. Thus, such lower density and higher strength materials translates to greater strength to weight ratio. It is understood that modifications which do not substantially affect the activity of the various embodiments of this invention are also included within the definition of the invention provided herein. Accordingly, the following examples are intended to illustrate but not limit the present invention.

EXAMPLE I

This example shows how a carbon fiber material can be infused with CNTs in a continuous process to target thermal and electrical conductivity improvements for use in deicing applications.

In this example, the maximum loading of CNTs on fibers is targeted. 34-700 12 k carbon fiber tow with a tex value of 800 (Grafil Inc., Sacramento, Calif.) is implemented as the carbon fiber substrate. The individual filaments in this carbon fiber tow have a diameter of approximately 7 μm.

Figure 12:
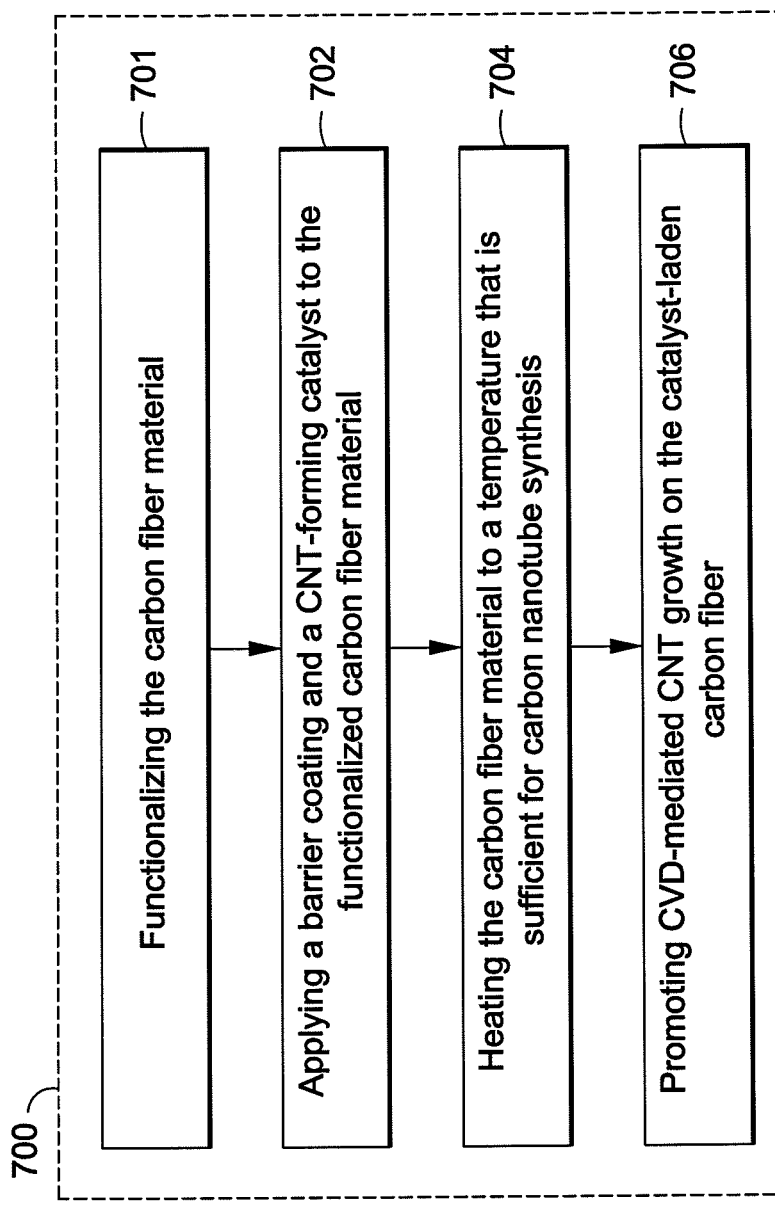
FIG. 12 shows a process for producing CNT-infused carbon fiber material in accordance with the illustrative embodiment of the present invention.
Figure 13:
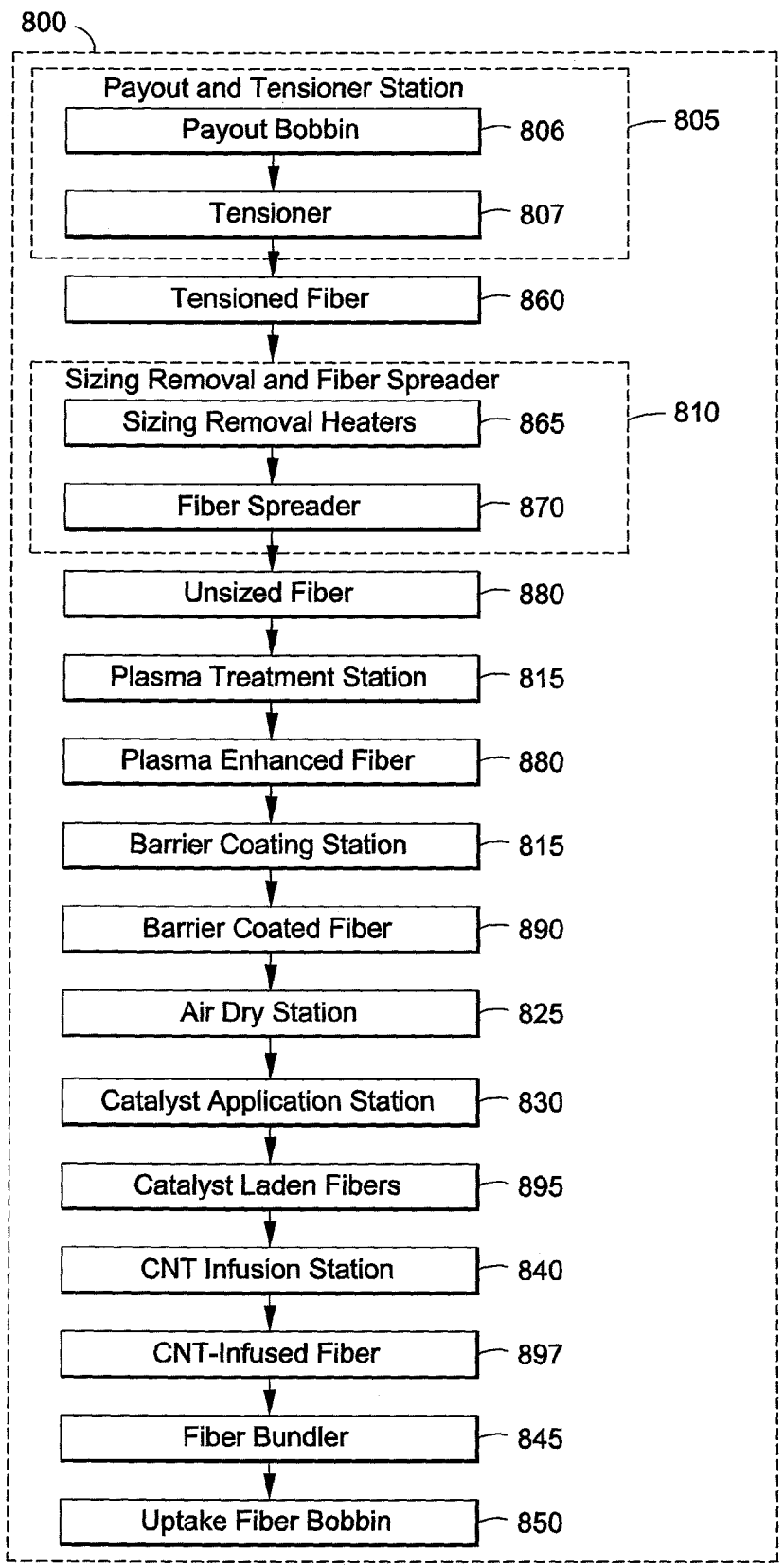
FIG. 13 shows how a carbon fiber material can be infused with CNTs in a continuous process to target thermal and electrical conductivity improvements.

FIG. 12 depicts system 800 for producing CNT-infused fiber in accordance with the illustrative embodiment of the present invention. System 800 includes a carbon fiber material payout and tensioner station 805, sizing removal and fiber spreader station 810, plasma treatment station 815, barrier coating application station 820, air dry station 825, catalyst application station 830, solvent flash-off station 835, CNT-infusion station 840, fiber bundler station 845, and carbon fiber material uptake bobbin 850, interrelated as shown.

Payout and tension station 805 includes payout bobbin 806 and tensioner 807. The payout bobbin delivers carbon fiber material 860 to the process; the fiber is tensioned via tensioner 807. For this example, the carbon fiber is processed at a linespeed of 2 ft/min.

Fiber material 860 is delivered to sizing removal and fiber spreader station 810 which includes sizing removal heaters 865 and fiber spreader 870. At this station, any "sizing" that is on fiber 860 is removed. Typically, removal is accomplished by burning the sizing off of the fiber. Any of a variety of heating means can be used for this purpose, including, for example, an infrared heater, a muffle furnace, and other non-contact heating processes. Sizing removal can also be accomplished chemically. The fiber spreader separates the individual elements of the fiber. Various techniques and apparatuses can be used to spread fiber, such as pulling the fiber over and under flat, uniform-diameter bars, or over and under variable-diameter bars, or over bars with radially-expanding grooves and a kneading roller, over a vibratory bar, etc. Spreading the fiber enhances the effectiveness of downstream operations, such as plasma application, barrier coating application, and catalyst application, by exposing more fiber surface area.

Multiple sizing removal heaters 865 can be placed throughout the fiber spreader 870 which allows for gradual, simultaneous desizing and spreading of the fibers. Payout and tension station 805 and sizing removal and fiber spreader station 810 are routinely used in the fiber industry; those skilled in the art will be familiar with their design and use.

The temperature and time required for burning off the sizing vary as a function of (1) the sizing material and (2) the commercial source/identity of carbon fiber material 860. A conventional sizing on a carbon fiber material can be removed at about 650° C. At this temperature, it can take as long as 15 minutes to ensure a complete burn off of the sizing. Increasing the temperature above this burn temperature can reduce burn-off time. Thermogravimetric analysis is used to determine minimum burn-off temperature for sizing for a particular commercial product.

Depending on the timing required for sizing removal, sizing removal heaters may not necessarily be included in the CNT-infusion process proper; rather, removal can be performed separately (e.g., in parallel, etc.). In this way, an inventory of sizing-free carbon fiber material can be accumulated and spooled for use in a CNT-infused fiber production line that does not include fiber removal heaters. The sizing-free fiber is then spooled in payout and tension station 805. This production line can be operated at higher speed than one that includes sizing removal.

Unsized fiber 880 is delivered to plasma treatment station 815. For this example, atmospheric plasma treatment is utilized in a 'downstream' manner from a distance of 1 mm from the spread carbon fiber material. The gaseous feedstock is comprised of 100% helium.

Plasma enhanced fiber 885 is delivered to barrier coating station 820. In this illustrative example, a siloxane-based barrier coating solution is employed in a dip coating configuration. The solution is 'Accuglass T-11 Spin-On Glass' (Honeywell International Inc., Morristown, N.J.) diluted in isopropyl alcohol by a dilution rate of 40 to 1 by volume. The resulting barrier coating thickness on the carbon fiber material is approximately 40 nm. The barrier coating can be applied at room temperature in the ambient environment.

Barrier coated carbon fiber 890 is delivered to air dry station 825 for partial curing of the nanoscale barrier coating. The air dry station sends a stream of heated air across the entire carbon fiber spread. Temperatures employed can be in the range of 100° C. to about 500° C.

After air drying, barrier coated carbon fiber 890 is delivered to catalyst application station 830. In this example, an iron oxide-based CNT forming catalyst solution is employed in a dip coating configuration. The solution is 'EFH-1' (Ferrotec Corporation, Bedford, N.H.) diluted in hexane by a dilution rate of 200 to 1 by volume. A monolayer of catalyst coating is achieved on the carbon fiber, material. 'EFH-1' prior to dilution has a nanoparticle concentration ranging from 3-15% by volume. The iron oxide nanoparticles are of composition $Fe_2O_3$ and $Fe_3O_4$ and are approximately 8 nm in diameter.

Catalyst-laden carbon fiber material 895 is delivered to solvent flash-off station 835. The solvent flash-off station sends a stream of air across the entire carbon fiber spread. In this example, room temperature air can be employed in order to flash-off all hexane left on the catalyst-laden carbon fiber material.

After solvent flash-off, catalyst-laden fiber 895 is finally advanced to CNT-infusion station 840. In this example, a rectangular reactor with a 12 inch growth zone is used to employ CVD growth at atmospheric pressure. 98.0% of the total gas flow is inert gas (Nitrogen) and the other 2.0% is the carbon feedstock (acetylene). The growth zone is held at 750° C. For the rectangular reactor mentioned above, 750° C. is a relatively high growth temperature, which allows for the highest growth rates possible.

After CNT-infusion, CNT-infused fiber 897 is re-bundled at fiber bundler station 845. This operation recombines the individual strands of the fiber, effectively reversing the spreading operation that was conducted at station 810.

The bundled, CNT-infused fiber 897 is wound about uptake fiber bobbin 850 for storage. CNT-infused fiber 897 is loaded with CNTs approximately 50 μm in length and is then ready for use in composite materials with enhanced thermal and electrical conductivity.

CNT infused fiber 897 is then wound applied as a surface layer to an existing composite structure as demonstrated in FIG. 3 to provide deicing capabilities using an integrated electrical circuit as shown in FIG. 4. The resulting resistive heating element has a resistivity of less than 5 ohm-meters.

It is noteworthy that some of the operations described above can be conducted under inert atmosphere or vacuum for environmental isolation. For example, if sizing is being burned off of a carbon fiber material, the fiber can be environmentally isolated to contain off-gassing and prevent damage from moisture. For convenience, in system 800, environmental isolation is provided for all operations, with the exception of carbon fiber material payout and tensioning, at the beginning of the production line, and fiber uptake, at the end of the production line.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other processes, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A composite structure comprising:
   a body adapted for use as a structural member of an aircraft wherein the body carries a portion of a load induced by flight of the aircraft;
   a fiber substrate dispersed through a portion of the body;
   a plurality of carbon nanotubes (CNTs) that have been grown in-situ on the fiber substrate so as to be aligned and oriented perpendicular to the fiber substrate, thereby forming a CNT-infused fiber material; and
   a first electrode and a second electrode that are electrically coupled to the portion of the body that comprises the CNT-infused fiber material, wherein application of an electric current through the first and second electrodes and the intervening CNT-infused fiber material generates heat within the CNT-infused fiber material, thereby heating the body of the composite structure, thereby deicing or preventing ice formation on a surface of the composite structure.

2. The composite structure of claim 1, wherein the body is adapted to form a portion of a wing of an airplane.

3. The composite structure of claim 1, wherein the body is adapted to form a portion of a blade of a helicopter.

4. The composite structure of claim 1, wherein the body is adapted to form a portion of a propulsor blade of an airplane.

5. The composite structure of claim 1, further comprising a matrix material that is dispersed through the portion of the body that contains the CNT-infused fiber material.

6. The composite structure of claim 1, wherein the fiber substrate comprises a glass.

7. The composite structure of claim 1, wherein the fiber substrate carbon.

8. The composite structure of claim 1, wherein the fiber substrate a ceramic.

9. The composite structure of claim 1, wherein the plurality of CNTs have been grown as one or more of a group consisting of single-walled CNTs, double-walled CNTs, multi-walled CNTs, and mixtures thereof.

10. The composite structure of claim 1, wherein the plurality of CNTs have been grown to be generally uniform in length and uniform in distribution.

11. The composite structure of claim 1, wherein plurality of CNTs have been grown to have a length of about 1 micron to about 500 microns.

12. The composite structure of claim 1, wherein the plurality of CNTs have been grown to have a length from about 1 micron to about 10 microns.

13. The composite structure of claim 1, wherein the plurality of CNTs have been grown to have a length from about 10 microns to about 100 microns.

14. The composite structure of claim 1, wherein the plurality of CNTs have been grown to have a length from about 100 microns to about 500 microns.

15. The composite structure of claim 1, wherein the plurality of CNTs have been grown to have a uniformity of distribution that is characterized by a density up to about 15,000 nanotubes per square micrometer.

16. The composite structure of claim 1, wherein the fiber substrate is selected from a filament, a tow, a yarn, a tape, a unidirectional tape, a fiber-braid, a woven fabric, a non-woven fiber mat, a fiber ply, and a 3D woven structure.

17. The composite structure of claim 1, wherein the CNT-infused fiber material is disposed near a surface of the body.

18. The composite structure of claim 1, wherein the CNT-infused fiber material is disposed throughout the entire.

19. The composite structure of claim 5, wherein the matrix material comprises one or more of a group consisting of an epoxy, a phenolic resin, a cement, a glass, a thermoplastic, and a thermoset.

20. The composite structure of claim 1, wherein the electric current is created by application of a direct current (DC) voltage from between about 1 to about 24 volts DC.

21. The composite structure of claim 1, wherein the electric current is created by application of an alternating current (AC) voltage between about 60 and about 480 volts AC.

22. A method, comprising the steps of:
growing a plurality of carbon nanotubes (CNTs) in-situ on a fiber substrate such that the CNTs are aligned and oriented perpendicular to the fiber substrate, thereby forming a CNT-infused fiber material;

forming a composite structure of an aircraft, wherein the composite structure is adapted to carry a portion of a load induced by flight of the aircraft, the composite structure having a body having a portion that comprises the CNT-infused fiber material;

electrically coupling a first electrode and a second electrode to the portion of the body that comprises the CNT-infused fiber material, wherein application of an electric current through the first and second electrodes and the intervening CNT-infused fiber generates heat within the CNT-infused fiber material, thereby heating the body of the composite structure, thereby deicing or preventing ice formation on a surface of the composite structure.

23. The method of claim 22, wherein the step of applying an electric current comprises applying a direct current (DC) voltage that is between about 1 and about 24 volts DC.

24. The method of claim 22, wherein the step of applying an electric current comprises applying a alternating current (AC) voltage that is between about 60 and about 480 volts AC.

25. The composite structure of claim 19, further comprising a plurality of loose CNTs disposed within the matrix material.

* * * * *